US007876974B2

(12) United States Patent
Brajovic

(10) Patent No.: US 7,876,974 B2
(45) Date of Patent: Jan. 25, 2011

(54) METHOD FOR IMPROVING DIGITAL IMAGES AND AN IMAGE SENSOR FOR SENSING THE SAME

(76) Inventor: Vladimir Brajovic, 513 Harrogate Rd., Pittsburgh, PA (US) 15241

( * ) Notice: Subject to any disclaimer, the term of this patent is extended or adjusted under 35 U.S.C. 154(b) by 1031 days.

(21) Appl. No.: 10/929,188

(22) Filed: Aug. 30, 2004

(65) Prior Publication Data

US 2005/0089239 A1 Apr. 28, 2005

Related U.S. Application Data

(60) Provisional application No. 60/499,132, filed on Aug. 29, 2003.

(51) Int. Cl.
G06K 9/40 (2006.01)
H04N 9/74 (2006.01)
(52) U.S. Cl. .................... 382/264; 348/597
(58) Field of Classification Search ................. 382/264, 382/254, 275, 260; 348/597
See application file for complete search history.

(56) References Cited

U.S. PATENT DOCUMENTS

| 4,786,818 | A |   | 11/1988 | Mead et al. |   |
|---|---|---|---|---|---|
| 4,812,903 | A |   | 3/1989 | Wagensonner et al. |   |
| 5,012,333 | A | * | 4/1991 | Lee et al. | 358/520 |
| 5,062,000 | A |   | 10/1991 | Harris et al. |   |
| 5,086,219 | A |   | 2/1992 | Koch et al. |   |
| 5,142,592 | A | * | 8/1992 | Moler | 382/200 |
| 5,187,581 | A | * | 2/1993 | Kamatani | 348/230.1 |
| 5,223,754 | A |   | 6/1993 | Decker et al. |   |
| 5,293,058 | A |   | 3/1994 | Tsividis |   |
| 5,454,044 | A |   | 9/1995 | Nakajima |   |
| 5,471,987 | A |   | 12/1995 | Nakazawa et al. |   |
| 5,608,813 | A |   | 3/1997 | Nakajima |   |
| 5,796,870 | A |   | 8/1998 | Takeo |   |
| 5,917,544 | A | * | 6/1999 | Sobotta et al. | 348/222.1 |
| 5,991,456 | A |   | 11/1999 | Rahman et al. |   |
| 6,053,613 | A | * | 4/2000 | Wei et al. | 351/205 |
| 2002/0028025 | A1 | * | 3/2002 | Hong | 382/260 |
| 2002/0149685 | A1 | * | 10/2002 | Kobayashi et al. | 348/252 |
| 2003/0169944 | A1 | * | 9/2003 | Dowski et al. | 382/279 |
| 2004/0081359 | A1 | * | 4/2004 | Bascle et al. | 382/181 |
| 2004/0091164 | A1 | * | 5/2004 | Sakatani et al. | 382/254 |
| 2004/0119847 | A1 | * | 6/2004 | Kume et al. | 348/239 |

(Continued)

OTHER PUBLICATIONS

E. H. Land et al., "Lightness and Retinex Theory," *Journal of the Optical Society of America*, vol. 61, No. 1, Jan. 1971, pp. 1-11.

(Continued)

*Primary Examiner*—Anand Bhatnagar
*Assistant Examiner*—Randolph Chu
(74) *Attorney, Agent, or Firm*—Robert P. Lenart, Esq.; Alan G. Towner, Esq.; Pletragalio Gordon Alfano Bosick & Raspanti, LLP

(57) ABSTRACT

The present invention provides an image processing method. In one embodiment, the method provides discontinuity-preserving image smoothing and segmentation, noise reduction, reduction of image variations particularly those variations caused by illumination conditions, exposure compensation, and dynamic range compression. The present invention also provides an electronic image sensor that is able to detect high dynamic range optical images and produce electronic images with reduced dynamic range.

38 Claims, 11 Drawing Sheets

U.S. PATENT DOCUMENTS

2004/0169872 A1* 9/2004 Maurer ..................... 358/1.9
2005/0013477 A1* 1/2005 Ratti et al. ................. 382/154

OTHER PUBLICATIONS

T. G. Stockham, Jr., "Image Processing in the Context of a Visual Model," *Proceedings of the IEEE*, vol. 60, No. 7, Jul. 1972 pp. 828-842.

B. K. P. Horn, "Determining Lightness From an Image," *Computer Graphics and Image Processing*, vol. 3, No. 1, 1974, pp. 277-299.

S. Geman et al., "Stochastic Relaxation, Gibbs Distributions, and the Bayesian Restoration of Images," *IEEE Transactions on Pattern Analysis and Machine Intelligence*, vol. PAMI-6, No. 6, Nov. 1984, pp. 721-741.

D. Terzopoulos, "Regularization of Inverse Visual Problems Involving Discontinuities," *EEE Transactions on Pattern Analysis and Machine Intelligence*, vol. PAMI-8, No. 4, Jul. 1986, pp. 413-424.

J. Marroquin et al., "Probabilistic Solution of Ill-Posed Problems in Computational Vision," Journal of the American Statistical Association, vol. 82, No. 397, Mar. 1987, pp. 76-89.

J. Hutchinson et al., "Computing Motion Using Analog and Binary Resistive Networks," *IEEE*, Mar. 1988, pp. 52-63.

A. Lumsdaine et al., "Nonlinear Analog Networks for Image Smoothing and Segmentation," *IEEE*, 1990, pp. 987-991.

P. Perona et al., "Scale-Space and Edge Detection Using Anisotropic Diffusion," *IEEE Transactions on Pattern Analysis and Machine Intelligence*, vol. 12, No. 7, Jul. 1990, pp. 629-639.

P. Perona et al., "Diffusion Networks for On-Chip Image Contrast Normalization," *IEEE*, 1994, 5 pgs.

D. J. Jobson et al., "A Multiscale Retinex for Bridging the Gap Between Color Images and the Human Observation of Scenes," *IEEE Transactions on Image Processing*, vol. 6, No. 7, July 1997, pp. 965-976.

C. Tomasi et al., "Bilateral Filtering for Gray and Color Images," *Proceedings of IEEE Int. Conf On Computer Vision*, 1998, pp. 839-846.

J. Tumblin et al., "LCIS: A Boundary Hierarchy For Detail-Preserving Contrast Reduction," *Proceedings ACM SIGGRAPH 99*, pp. 83-90.

F. Durand et al., "Fast Bilateral Filtering for the Display of High-Dynamic-Range Images," *ACM SIGGRAPH 2002*.

V. Brajovic, "A Model for Reflectance Perception in Vision," Bioengineered and Bioinspired Systems, *Proceedings of SPIE*, vol. 5119, May 19-21, 2003, Maspalomas, Gran Canaria, Spain, 9 pgs.

V. Brajovic, "Shot Noise Suppression in Image Sensors," Visual Information Processing XIII, SPIE Defense and Security Symposium, Apr. 12-16, 2004, Orlando, FL, 5 pgs.

* cited by examiner

METHOD FOR IMPROVING DIGITAL IMAGES AND AN IMAGE SENSOR FOR SENSING THE SAME

CROSS REFERENCE TO RELATED APPLICATIONS

This application claims the benefit of U.S. Provisional Application No. 60/499,132 filed Aug. 29, 2003.

GOVERNMENT CONTRACTS

The present invention was supported by the National Science Foundation under the contract IIS-0082364. The United States Government has certain rights in this invention.

FIELD OF THE INVENTION

The present invention relates to an electronic image sensor. More specifically, the present invention relates to an image sensor that is capable of detecting high dynamic range optical images and producing electronic images with reduced dynamic range.

BACKGROUND INFORMATION

Electronic imaging is important in many applications, including computer vision, robotics, industrial automation, surveillance and monitoring, document imaging, medical imaging, and digital photography, among others. One problem with the present state of the art is that the dynamic range of natural optical images can easily exceed the available dynamic range of the imaging devices, the imaging devices either being photochemical emulsions/films/plates or electronic image sensors. For example, optical images in nature may exhibit dynamic range in excess of 1:100,000 even 1:1,000,000. This means that bright parts of an image (e.g., sun-illuminated surfaces) can generate as much as 1,000,000 stronger optical signals than the optical signals generated by dark parts of an image (e.g., deep shadows). When such high dynamic range optical images are received through the image formation system (e.g., optical lens) and projected on the imaging media, the imaging media cannot easily sense such a high dynamic range signal, resulting in signal saturation and clipping in the sensed image. For example, when imaging a human subject standing in a room in front of a bright window, the window in the resultant image is completely white (e.g., "washed out"), while the subject is completely black (e.g., a silhouette). Neither the scene details in the window area, nor the details of the subject can be discerned in the resultant image.

There are numerous other examples where imaging fails due to limited dynamic range of imaging devices. An automobile entering or exiting a tunnel will experience high dynamic range optical images. Conventional image sensors can either image bright portions (e.g., tunnel exit) or dark portions (e.g., interior of the tunnel), but not both simultaneously. A surveillance camera on a sunny day will normally report shadows as completely black and brightly illuminated surfaces as completely white, again limiting usefulness of the entire surveillance system. As these examples illustrate, the limited dynamic range problem of state-of-the-art imaging devices severely limits the usefulness of the entire imaging system.

Another problem caused by dynamic range is mismatch of the signal dynamic range of sensed images (e.g., film or electronic images) and the dynamic range available at a display or print medium. For example, the electronic images sensed by a film, a CCD image sensor, synthetically generated images, or images mathematically reconstructed in computed tomography (CT) or magnetic resonance imaging (MRI) could be 1:1000 or more. On the other hand, common displays could only render dynamic range of 1:256 or less. Print media exhibits dynamic range of 1:50 or less. The problem is how to render a high dynamic range image on a low dynamic range display/print while showing all the details. In photography and computer graphics, the process of converting real-world color and intensities to display or print colors and intensities is known as "tone mapping". Clearly, a naïve signal scaling would destroy some details due to quantization and/or signal clipping.

The optical images are produced by having a light source illuminate objects and surfaces of a visual scene. This light field is herein called an "illumination field" or simply "illumination". The "visual scene", or simply "scene", is commonly understood as a collection of surfaces and objects that an observer (e.g., camera or a human) is looking at. The scene appearance is substantially defined by the reflective properties of its surfaces and objects. The scene's reflective property distribution, called herein "reflectance map" or simply "reflectance", reflects some of the illumination field to radiate an optical image. This optical image, called herein "radiance map" or "optical image", is then sensed by a camera, an eye or other suitable imaging system.

When interacting with a three-dimensional visual scene, an illumination field could produce significant shadow patterns and have a dynamic range of 100,000:1 or more. Furthermore, the illumination-induced variations (e.g., shadow patterns, and interreflections) may completely alter the appearance of an object in a scene. Computer vision algorithms that often aim to recognize objects in a visual scene have difficulty accounting for all possible variations resulting in unreliable performance in real-world, unconstrained environments. Humans, on the other hand, seem to be able to compensate for a wide variation in illumination field. Humans are rarely fooled even when complicated illumination fields produce deep shadows and complicated patterns in the scene.

It is well known that object reflectance have dynamic ranges of 100:1 or less. For example, the reflectance of black velvet is about 0.04 (e.g., reflects at the most 4% of the illumination), while the reflectance of white fresh snow is about 0.96 (e.g., reflects 96% of the illumination at the most). Therefore, one way to approximately obtain the true appearance of an object, that is its underlying reflectance, is to illuminate the object with a uniform light source from all possible directions to avoid shadows. Then the radiance map will largely have dynamic range of the underlying reflectance map. While this may be possible in some restricted industrial settings at great expense, it is not practical in many real-world situations where natural ambient illumination and general shape and arrangement of objects cannot be controlled. Therefore, we are faced with the problem of estimating underlying object reflectance from radiance maps.

The experts in the art have strived to compensate for generally widely varying illumination fields in order to recover a low dynamic range reflectance maps and thus avoid the high dynamic range problem. Commonly, a radiance map I(x,y) is regarded as a product:

$$I(x,y) = R(x,y) \cdot L(x,y) \qquad (1)$$

where R(x,y) is the reflectance map of the object and L(x,y) is the illumination field at each point (x,y). Computing the reflectance and the illuminance fields from real images is, in general, an ill-posed problem. Therefore, various assumptions and simplifications about illumination field L, or reflectance R, or both have been proposed in prior art in order to attempt to solve the problem. A common assumption is that L varies slowly while R can change abruptly. For example, homomorphic filtering (T. G. Stockam, Jr., "Image Processing in the Context of a Visual Model," *Proceedings of the IEEE*, Vol. 60, 1972, pp. 828-842) uses this assumption to extract R by high-pass filtering the logarithm of the image, log(I). Horn assumes that L is smooth and that R is piece-wise constant (B. K. P. Horn, "Determining Lightness from an Image," *Computer Graphics and Image Processing* 3, 1, 1974, pp. 277-299). Then taking Laplacian of the image's logarithm (log(I)) removes slowly varying L while marking discontinuities caused by the changes in R.

Of course, in most natural images the assumptions used in these examples are violated. For example, shadow boundaries on a sunny day will create abrupt changes in L. Under such conditions the homomorphic filtering would create a "halo" (i.e., negative gradient) artifact in the recovered reflectance at the shadow boundary. Horn's method would interpret the abrupt change in L as a change in R and wrongly estimate R.

Closely related to the homomorphic filtering is Land's "retinex" theory (E. H. Land and J. J. McCann, "Lightness and Retinex Theory," *Journal of the Optical Society of America* 61, No. 1, January 1971, pp. 1-11). Retinex estimates the reflectance R as the difference of the logarithm of the image I and the logarithm of low-pass filtered version of the image that serves as the estimate for L(x,y). The "halo" artifacts are produced at large discontinuities in I(x,y) because the low-pass filtered image smoothes over large discontinuities. Rahman, et al. (U.S. Pat. No. 5,991,456, also D. J. Jobson, et al., "A multiscale Retinex for bridging the gap between color images and the human observation of scenes," *IEEE Tran. Images Processing*, Vol. 6, No. 7, 1997, pp. 965-976) extended the algorithm by essentially combining several low-pass copies of I(x,y) using different cut-off frequencies for each low-pass filter. Since this combination retains some moderately high spatial frequencies, the estimate of L(x,y) can better describe abrupt changes in L. This helps reduce halos, but does not eliminate them.

The halo artifact, also called "negative gradient" or "edge banding", is a visible bright and dark band along discontinuities in the input image. This artifact is more visible near high contrast discontinuities. The halo artifact is a very objectionable artifact for human viewing. In medical and automated computer vision, halo artifacts could be misleading and potentially dangerous.

In order to eliminate the notorious halo artifacts, Tumblin et al. introduced the low curvature image simplifier (LCIS) hierarchical decomposition of an image (Tumblin, J., and Turk, G. "LCIS: A boundary hierarchy for detail-preserving contrast reduction," *Proceedings ACM SIGGRAPH 99*, pp. 83-90). Each component in this hierarchy is computed by solving a partial differential equation inspired by anisotropic diffusion (Perona, P., and Malik, J., "Scale-space and edge detection using anisotropic diffusion," *IEEE Tran. Pattern Analysis and Machine Intelligence*, Vol. 12, No. 7, 1990, pp. 629-639). At each hierarchical level, the method segments the image into smooth (low-curvature) regions while stopping at sharp discontinuities. The hierarchy describes progressively smoother components of I(x,y). L is then mostly described by smooth components (accounting for abrupt discontinuities) while R is described with components containing a greater spatial detail. Tumblin and Turk attenuate the smooth components and reassemble the image to create a low-contrast version of the original while compensating for the wide changes in the illumination field. This method drastically reduces the dynamic range but tends to overemphasize fine details, thus still creating objectionable artifacts in the result. The algorithm is computationally intensive and requires the selection of no less than eight different parameters that need to be appropriately selected by a human user for a particular image.

Since Tumblin's method attempts to account for discontinuities, it is an improvement over other dynamic compression algorithms based on linear harmonic decomposition of the signal. For example, U.S. Pat. Nos. 5,012,333 and 4,812,903 teach methods of decomposing an input image into a low-frequency component and a high-frequency component. By modifying the low-frequency component with a nonlinear tone scale curve and amplifying the high-frequency component (unsharp masking), one can combine the two modified components back to form a new image which has a smaller dynamic range and yet retain most image details. U.S. Pat. Nos. 5,608,813 and 5,454,044 teach similar methods, but formulate them in spatial domain. These methods all suffer from producing halo artifacts around high contrast edges.

Another approach to deal with halo artifacts around sharp discontinuities in the original image has been disclosed in U.S. Pat. Nos. 5,471,987 and 5,796,870, where the low-frequency component is calculated from a weighted average of pixels within a predetermined kernel. The weighting within the kernel is chosen so that less weight is applied to a particular pixel in the kernel if its absolute intensity difference from the center pixel is large. The weighting is also chosen so that less weight is applied to a particular pixel if it is located farther away from the center pixel. By such a differential weighting scheme, pixels across a high contrast edge are not averaged together; therefore, the low-frequency component retains relatively sharp high contrast edges. This type of selective weighting in both space dimension and signal intensity dimension has been dubbed "bilateral filtering" by Tomasi, et. al. (C. Tomasi and R. Manduchi, "Bilateral filtering for gray and color images," *Proceedings of IEEE Int. Conf. on Computer Vision*, 1998, pp. 839-846). In essence, these approaches may yield discontinuity-preserving smoothing method for producing low-frequency component of the original signal that substantially preserves sharp discontinuities. When such a low-frequency component is subtracted from the original image signal, the resulting high-frequency components will not exhibit halos, the overshoots or undershoots, near a high contrast edge. The main drawback of bilateral and similar filtering is that it is very slow to compute. Another drawback is that in some situations the result may require local corrections, which requires manually setting numerous parameters.

Durand et al. (F. Durand and J. Dorsey, "Fast Bilateral Filtering for the Display of High-Dynamic-Range Images," ACM SIGGRAPH 2002, pp. 257-265) teach a method of speeding up bilateral filtering in image dynamic range compression. Using bilateral filtering, they first compute a discontinuity-preserving smoothed version of the logarithm of the original image that they call the "base layer". Durand et al. then subtract the base layer from the logarithm of the original to obtain the high-frequency component which they call the "detail layer". Finally, they combine an attenuated base layer with the detail layer and perform exponentiation to obtain the final image that has compressed dynamic range after additional correction is performed where necessary. These steps are summarized in the following algorithm:

```
begin
    log_input = log(input_image)
    base_layer = BilateralFiltering(log_input)
    detail_layer = log_input − base_layer
    temp_image = compression_factor*base_layer + detail_layer
    output_image = exp(temp_image)
end.
```

These steps generally illustrate what has been commonly done in previous art to compress the dynamic range and improve contrast of images: 1) the input image is decomposed into a low-frequency component; 2) the low-frequency component is subtracted from the original to obtain a high-frequency component; 3) either of the two components, or both, are compressed through linear or nonlinear mapping function, and 4) the results are recombined to yield the result.

A human observer seems to be able to easily see individual objects in both very bright and very dark areas of a high dynamic range scene. This is probably because the eye adapts to local intensity levels as we scan the different regions of the scene. Mead, et al. in U.S. Pat. No. 4,786,818 describes an image sensor that emulates the vertebrate retina in producing space-time derivative signals in response to image pixels. By producing the space derivatives, the D.C. component of the high dynamic range scene is largely removed, resulting in an image with lesser signal dynamics. Mead's retina estimates the local intensities by smoothing the original image using a uniform resistive grid (similar to the resistive grid shown in FIG. 2). Then this smoothed version is subtracted from the original image. This sequence of operations produces "halos" at image discontinuities approximating a second derivative of the image. In fact, those skilled in the art will recognize that this sequence of operations is substantially similar to what is in computer vision commonly known as "Witch Hat" operator or "Difference-of-Gaussian" operator. A uniform resistive grid of FIG. 2 with substantially linear resistors solves a discretized version of the equation:

$$\nabla^2 u(x) = \frac{u(x) - v(x)}{\alpha^2}$$

where u(x) is the output voltage distribution, and v(x) is the input voltage distribution. The spatial smoothing constant α is determined by the ratio of the horizontal and vertical resistors as $\alpha = \sqrt{R_v/R_h}$. An infinite one-dimensional network performs convolution with an exponential kernel:

$$\frac{1}{2\alpha} e^{-|x|/\alpha}.$$

U.S. Pat. No. 5,086,219 by Koch, et al. shows a one-dimensional optical sensor for detecting discontinuities in the sensed image. The sensor uses two uniform resistive grids with different smoothing constants to produce two smooth versions of the original image. The two smooth results are subtracted to produce a high-pass filtered result commonly obtained by convolving the original image with the "Witch Hat" operator (e.g., difference of two exponential kernels). Finding signal zero crossings in this high-pass image substantially detects discontinuities in the original image.

A uniform resistive grid of FIG. 1 with substantially linear resistors solves the discretized version of the diffusion (heat) equation:

$$c\nabla^2 u(x, t) = \frac{\partial}{\partial t} u(x, t)$$

where x is a spatial coordinate, t is time, u(x,t) is the nodal voltage distribution at time t, and c is some positive constant. If the intensity distribution of an image v(x) is mapped as an initial condition to an infinite grid of FIG. 1 (e.g., u(x,0)=v(x)) and then allowed to diffuse throughout the horizontal resistors, the distribution of the nodal voltages at any point in time t>0 can be obtained by solving the above diffusion equation. This is exactly the relation that holds if the image is convolved with a Gaussian of variance $s^2=2ct$. Therefore, as the time passes the grid of FIG. 1 convolves the original image with increasingly broader Gaussian kernel.

FIGS. 1 and 2 show one-dimensional grid examples. As commonly known to those skilled in the art, these one-dimensional examples can be readily extended to two dimensions to solve two-dimensional problems pertaining to two-dimensional signals such as digital images.

When using linear resistors, the resistive grids shown in FIGS. 1 and 2 behave as linear smoothers. They cannot determine where the discontinuities occur in the input and will tend to blur across them. As discussed earlier, blurring across large discontinuities is not desirable, as it will produce objectionable halos. To achieve edge-preserving smoothing, the general solution has been to use nonlinear horizontal resistors whose current-voltage characteristics are nonlinear. As indicated in FIGS. 1 and 2, the prior art changes the equivalent horizontal resistance as a function of the voltage drop across the terminals of each corresponding horizontal resistor.

Perona and Malik iterate to numerically solve the diffusion equation for FIG. 1. At each iteration, they set the value for each horizontal resistor as the function of the voltage difference across the resistor's terminals so as to impede the diffusion process among nodes that exhibit large discontinuity, and to promote diffusion among nodes that are substantially of the equal intensity. As discussed earlier, Tumblin uses this form of anisotropic diffusion to compress the dynamic range of images.

Mead (U.S. Pat. No. 4,786,818) partially solves the discontinuity-smoothing problem by using saturating horizontal resistors in the grid of FIG. 2. The current through a saturating horizontal resistor will saturate as the voltage across the resistor becomes large, thus not smooth as much for large discontinuities. As discussed above, Mead subtracts this smoothed version from the original to compensate for wide illumination conditions.

Other proposed solutions based on stochastic arguments and minimization of cost functionals suggest a special type of horizontal resistor called resistive fuse. The resistive fuse acts as a common (linear) resistor for small voltages, but "blows" and conducts little or no current if the voltage across its terminals exceeds a predetermined threshold voltage. Since image intensity v(x) is quite different across a discontinuity, it is presumed that the large discontinuity will be caused in the smoothed output u(x) where the resistive fuse can then act as an open circuit and prevent blurring across that discontinuity. Harris (U.S. Pat. No. 5,062,000) and Decker (U.S. Pat. No. 5,223,754) show various circuit implementation of resistive fuses.

There are at least three problems associated with previously proposed discontinuity-preserving smoothing resistive networks. The first problem is that the presence or absence of a discontinuity in the input image v(x) is judged based on the smoothed result u(x). Therefore, the horizontal resistors that adjust their resistances as a function of their terminal voltages (e.g., Rh=f(u)) may not be able to appropriately capture discontinuities present in the input image. The second problem is that the circuit designer is left with a difficult task of creating nonlinear resistors whose resistivity changes with the voltage drop across its terminals. Generally, circuit designers have settled for nonlinear resistor functions Rh=f(u) that they can implement with reasonably complex circuits. These functions approximate desired behavior but may not be the most optimal choice from the mathematical point of view. Because of this difficulty, it seems that the designer is left with a very few degrees of freedom to create arbitrary f(u). The third problem is that when the network is to be solved numerically, the nonlinear resistive element requires iteration. For example, previous designs first solve the linear resistive network to obtain a version that smoothes everywhere including across discontinuities. Subsequently, large discontinuities in the smoothed result are indicated to determine which resistors to take out (e.g., which fuses to blow) and the process is iterated again. This iterative process is numerically involved and still suffers from the problem that the presence or absence of discontinuities is judged based on the smoothed image.

Despite these prior art systems, there remains a very real and substantial need for a numerically efficient image processing method for discontinuity-preserving image smoothing and segmentation, noise reduction, reduction of the image dynamic range reduction for printing and viewing, exposure problems compensation, and reduction of image appearance variation due to widely changing illumination conditions. Further, there is a very real and substantial need for an image sensing apparatus for sensing wide dynamic range optical images that is able to produce reduced dynamic range sensor images that preserve virtually all important spatial details contained in the optical image. The present invention has been developed in view of the foregoing.

SUMMARY OF THE INVENTION

An aspect of the present invention is to provide an electronic image sensor, comprising a detector array for detecting an input image and for producing an electronic image signal including a plurality of signal samples, and an image intensity processing array having a plurality of nodes in electronic communication with the signal samples, comprising a discontinuity-preserving smoothing system for producing a smooth image signal from the electronic image signal, a compensation system for compensating the electronic image signal with the smooth image signal to produce a compensated image signal, and a blending system for blending at least two of: the compensated image signal, the smooth image signal, and the electronic image signal to produce a sensor image signal.

Another aspect of the present invention is to provide a computer readable medium having stored thereon instructions which, when executed by a processor, cause the processor to perform the steps of supplying a first signal, representative of an image, to a processor, imposing a discontinuity-preserving smoothing constraint on the first signal to produce a second signal, compensating the first signal with the second signal to produce a third signal, and blending at least two of: the first signal, the second signal and the third signal to produce a blended signal.

Another aspect of the present invention is to provide a method for producing an improved signal comprising the steps of supplying a first signal, and imposing a discontinuity-preserving smoothness constraint on the first signal to produce a second signal, the discontinuity-preserving constraint controlled by a permeability function.

Another aspect of the present invention is to provide an apparatus comprising a circuit for producing an improved signal, comprising means for supplying a first signal, means for imposing a discontinuity-preserving smoothness constraint on the first signal to produce a second signal, means for compensating the first signal with the second signal to produce a third signal, and means for blending at least two of: the first signal, the second signal and the third signal to produce a blended signal.

Another aspect of the present invention is to provide a method of producing an improved signal, the signal having at least one spectral component comprising the steps of supplying a first signal to a first plurality of nodes, producing a second signal at a second plurality of nodes, the first plurality of nodes substantially corresponding to the second plurality of nodes, wherein the step of producing the second signal comprises imposing a smoothness constraint on the second signal restricting a signal difference between the nodes of the second signal, imposing a closeness constraint on the second signal, thereby restricting a signal difference between the corresponding nodes in the first signal and the second signal and balancing the smoothness constraint and the closeness constraint by controlling at least a portion of the first signal.

Another aspect of the present invention is to provide a method of producing an improved electronic image comprising the steps of supplying a first image, producing a second image by smoothing the first image while substantially preventing smoothing across sharp discontinuities in the first image, and compensating the first image with the second image to produce a compensated image.

Yet another aspect of the present invention is to provide an apparatus comprising a circuit for simultaneously computing samples of output signals from samples of input signals comprising a plurality of nodes in an array, each sample of the output signal residing on one node, means for providing the samples of the input signals, each input sample corresponding to each node in the array, means for interconnecting a pair of nodes in the array, and restricting in part the signal difference across each pair of nodes, means for restricting in part the difference between the samples of the output signal and the corresponding samples of the input signal for at least one node in the array, and means for controlling the means for interconnecting a pair of nodes in the array and the means for restricting in part the difference between the samples of the output signal and the corresponding samples of the input signal, wherein the means for controlling derives a control signal as a function of the input signal.

These and other aspects of the present invention will be more apparent from the following description.

DETAILED DESCRIPTION

Figure 1:
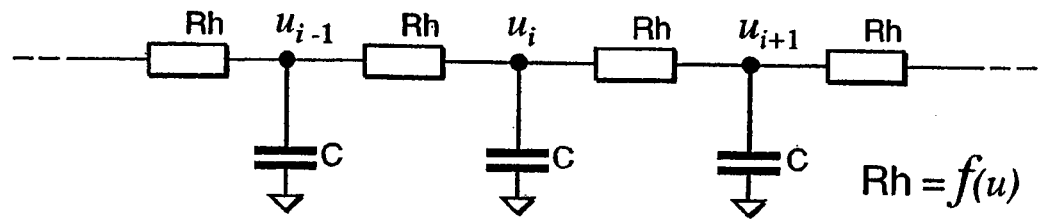
FIG. 1 is a schematic illustration of a prior art smoothing resistive grid that solves the Diffusion equation.
Figure 2:
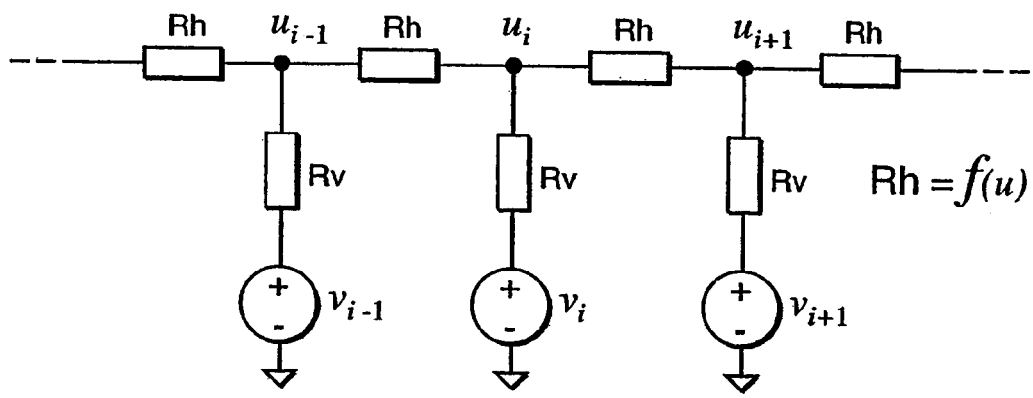
FIG. 2 is a schematic illustration of a prior art smoothing resistive grid that solves the Poisson equation.

The present invention pertains to an apparatus and method for improving signal quality. The invention preserves discontinuity while reducing noise, image variations particularly those variations caused by illumination conditions, exposure compensation, and dynamic range compression.

Referring to the drawings in greater detail wherein like reference numerals refer to similar or identical parts throughout various views, several preferred embodiments of the present invention and methods of practicing the present invention will be considered.

Figure 3:
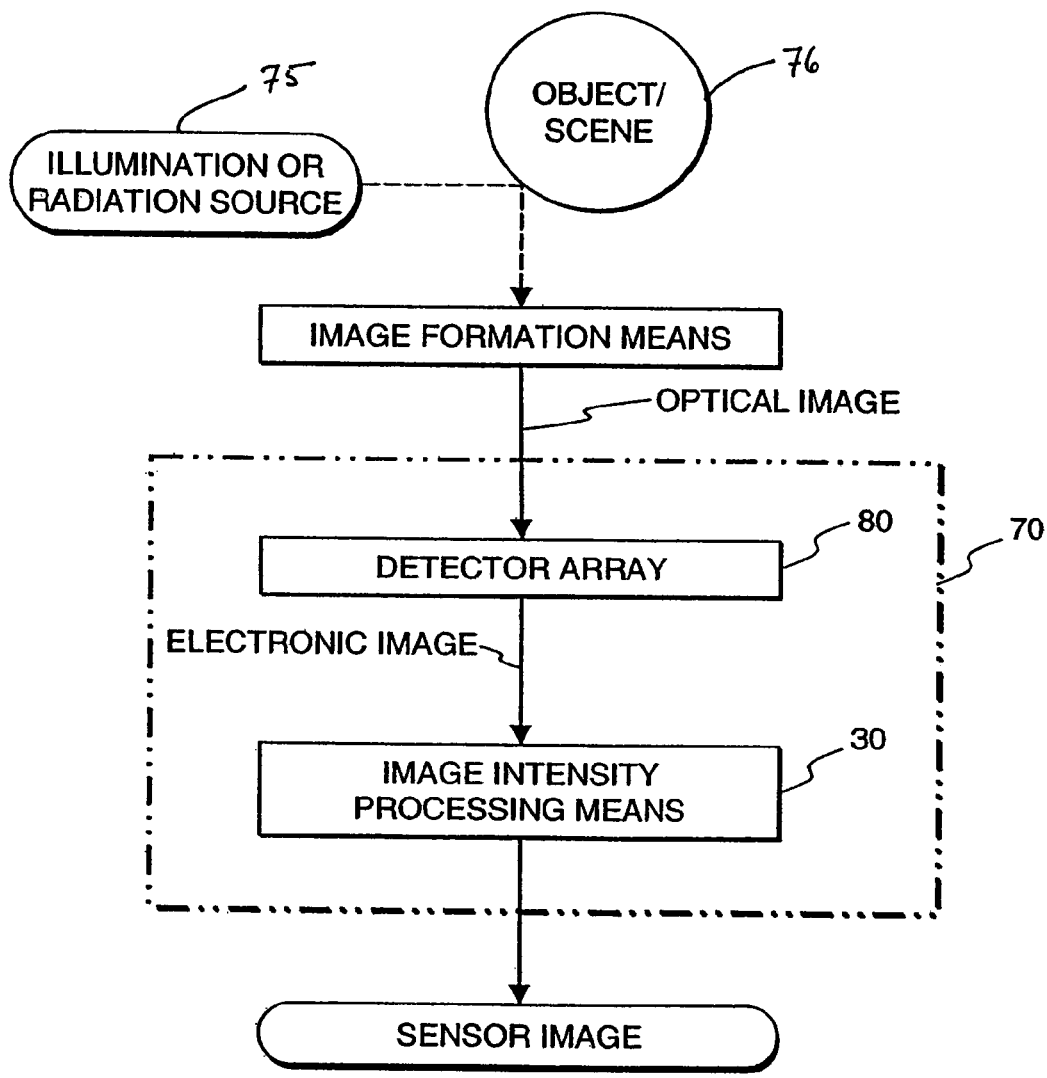
FIG. 3 is a block diagram showing an image sensor according to an embodiment of the present invention.

FIG. 3 shows a schematic representation of one embodiment of the present invention. It employs an image sensor 70 that detects and processes optical image impinging on its sensitive surface according to the present invention. The optical or acoustic images are detected by a detector array 80, which converts the image into an electronic image. The electronic image is sent from the detector array 80 to a signal-processing system 30 for processing according to the present invention. In one embodiment, the electronic image comprises a plurality of signal samples, each signal sample corresponding to a voltage, current or a sampled waveform at a specific (x,y) location on a grid. As used herein, the term "signal samples" means any voltage, current or other sampled waveform at a specific photodetector location within a grid.

The signal-processing system 30 produces a sensor image that has advantageous properties according to the present invention including lesser signal dynamics, lesser noise, lesser exposure problems, lesser object appearance variation due to illumination conditions, and enhanced detail in shadows, bright regions or both.

Those skilled in the art will realize that the optical images can be formed in many different ways depending on the imaging modality deployed. Generally, an illumination source 75 or radiation source illuminates the object. The scene reflects or otherwise modulates the illumination or radiation source that is subsequently collected by the image formation means to form the optical image. For example, in conventional photography, the illumination source 75 will be substantially visible light, which is reflected by the scene 76. In this case, the image formation means typically involve optics including an optical lens. In X-ray imaging the illumination source 75 will be a source of X-ray radiation, which is attenuated by the object material. In this case, the image formation means typically involve an appropriate geometric arrangement between the radiation source, the object and the sensitive surface or film to minimize scattering. Sometimes, the X-ray radiation may be converted to a visible radiation that can be sensed by silicon devices substantially sensitive to visible light. In another embodiment, infrared imaging requires an illumination source 75 capable of producing infrared radiation.

Figure 4:
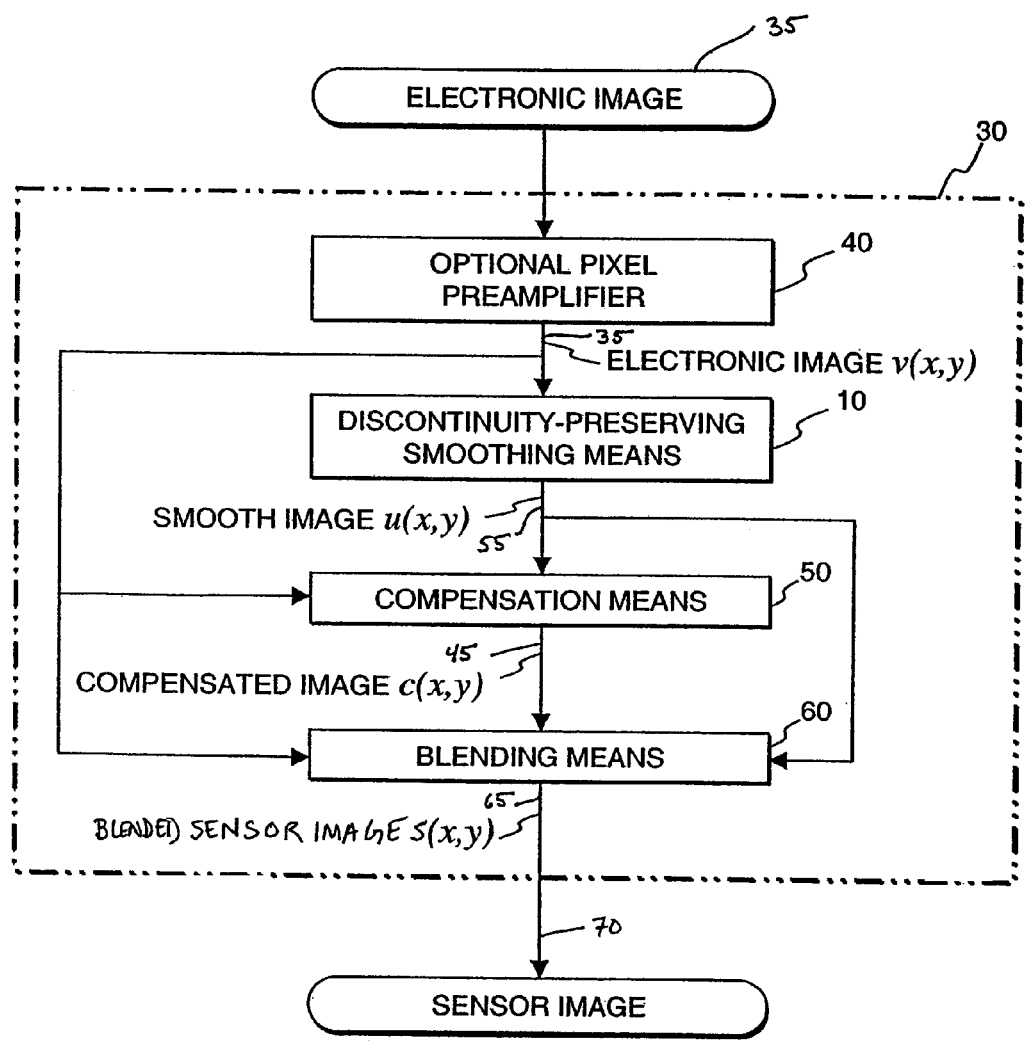
FIG. 4 is a block diagram showing details of a processing means of the image sensor of FIG. 3 in accordance with an embodiment of the present invention.

FIG. 4 shows a more detailed schematic representation of the signal-processing system 30 of the present invention. The electronic image 35 having a value of v(x,y) is supplied to discontinuity-preserving smoothing system 10 to produce an estimate of a smooth image u(x,y). In one embodiment, v(x,y) is a signal sample at a specific location on a grid or continuous function, including without limitation, voltage magnitudes, current magnitudes, charge, or other physical property. Compensation system 50 receives the smooth image u(x,y) and the electronic image v(x,y) and produces a compensated image 45 having a value of c(x,y) that has lesser dynamic range, fewer exposure problems, lesser noise and other reduced undesirable factors according to the present invention. Finally, a blending system 60 receives the compensated image from the compensation system 50, the smooth image 55 having a value of u(x,y) from the discontinuity-preserving smoothing system 10 and the electronic image 35 v(x,y) and blends them according to the present invention to produce a blended image 65 having a value of b(x,y) that serves as the sensor image at the output of the image sensor 70.

Optionally, the individual pixel values of the electronic image may be preamplified on a point-by-point basis in a linear or nonlinear fashion by an optional pixel preamplifier 40. An example pre-amplification, if used, may involve logarithmically mapping pixel values. Alternatively, the pre-amplification, if used, may deploy well-known gamma curve mapping or various S-curve type mappings. As another example, the pre-amplification may simply involve linear signal scaling. In some embodiments of the present invention this mapping could be performed via use of a look-up-table (LUT).

It can be appreciated that the image intensity processing system 30 can operate in the context of the image sensor 70 shown in FIG. 3 in which case the image intensity processing system 30 partially or entirely resides within the same integrated circuit with the detector array 80. According to the present invention, the image intensity processing system 30 can also be implemented as one or more separate processing modules as shown in FIG. 4. In that case, the intensity processing system 30 receives analog or digital electronic images from an appropriate image source that is external to the image intensity processing system 30. Such external image sources could be external image acquisition systems or image data files from computer readable storage medium. For example, in one embodiment the external image sources comprise a standard electronic or digital black-and-white or color camera, a standard photographic or x-ray film which produces a film image which is processed chemically or thermally and the processed film consequently digitized by a scanner/digitizer; a computed radiography (CR) system where a latent x-ray image is formed in a storage phosphor and a corresponding digital image is produced by reading out a storage phosphor by a CR reader; a direct radiography (DR) system where an x-ray image is directly acquired by the flat-panel detector array; a diagnostic scanner such as magnetic resonance imaging (MRI) or computed tomography (CT) which produce an electronic image directly or through mathematically computing, and printed photographs and documents that are digitized by a scanner/digitizer. The computer readable storage medium could be, for example, a solid state storage device such as random access (RAM) and read-only (ROM) memory systems, a magnetic storage medium such as hard drive, floppy disk or magnetic tape, an optical storage medium such as optical disks, CD-ROM and DVD-ROM; or any other physical device or medium which can be employed to store data including remote storage systems connected through a computer network, Internet and/or phone lines.

As it will be apparent from the further description of the present invention, the image intensity processing system 30 can be embodied as a space-efficient analog processor that can reside inside the image sensor 70. The further description of the present invention will also show that, without limitation, the image intensity processing system 30 can also be embodied in a digital, analog or mixed mode processor. In this case, those skilled in the art can appreciate that the functionality of the image intensity processing system 30 may be implemented in general-purpose hardware, software, special-purpose hardware (e.g., application specific integrated circuit), and firmware either alone or in any preferable combination using well-known signal processing signal-processing techniques. It should be also noted that for convenience the term "sensor image" is used herein to denote the final result of the image processing system 30 regardless of whether the processing system 30 resides inside an image sensor chip or in a separate processor chip or computer system.

The operation of the image intensity processing system 30 shown in FIG. 4 is now described. The discontinuity-preserving smoothing system 10 calculates the smooth image u(x,y) from the electronic image v(x,y) while substantially keeping large discontinuities found in v(xy) sharp.

Figure 5A:
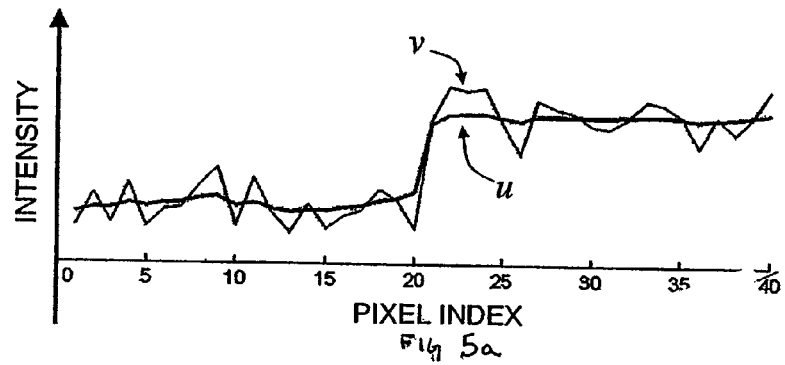
FIG. 5a is a graph showing a signal example and means for processing the signal in accordance with an embodiment of the present invention.

Using a one-dimensional signal example, FIG. 5 partially illustrates advantageous benefits of the present invention. FIG. 5*a* illustrates one instance of the one-dimensional electronic image v(x) that exhibits large discontinuity between pixels 20 and 21. The smooth image u(x) produced according to the present invention is a smooth version of the electronic image v(x) except that the smooth image u(x) substantially preserves the large discontinuity between the pixels 20 and 21. If the small variations seen in the electronic image of FIG. 5 are considered to be noise, and the large discontinuity between the pixels 20 and 21 is considered to be a feature of the underlying scene, then those skilled in the art will appreciate that the discontinuity-preserving smoothing system 10 produces a smooth image u(x) in which the image noise is considerably removed while not smoothing or degrading the image features that are due to the underlying scene. This is a very beneficial effect in many image processing applications.

Still referring to FIG. 5, if the small variations seen in the electronic signal of FIG. 5 are considered to be underlying features of the scene and the large discontinuity is considered to be the boundary between the shadow region (i.e., the portion of the signal spanning pixels 1 through 20) and the brightly illuminated region (i.e., the portion of the signal spanning pixels 21 through 40), then the smooth image u(x,y) provides an estimate for the strength of the illumination field in the shadow and brightly illuminated regions, respectively.

Figure 5B:
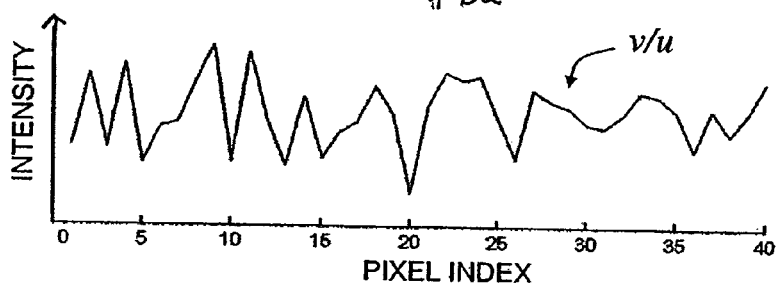
FIG. 5b is a graph showing a signal example and means for processing the signal in accordance with an embodiment of the present invention.

In one embodiment the compensation system 50 generates a compensated image c(x,y) according to:

$$c(x, y) = \frac{v(x, y)}{u(x, y)}, \quad \forall (x, y) \in \Omega \tag{2}$$

where $\Omega$ is the entire image region. By inspecting Equation (1), those skilled in the art can appreciate that the compensation system in this embodiment uses the smooth image u(x,y) as an estimate of the illumination field strength, divides the original electronic image v(x,y) by this estimate, and produces the compensated image c(x,y) to estimate the underlying reflectance of the scene that has lesser signal dynamics while enhancing scene details. Referring to FIG. 5*b*, small variations in the shadows are appropriately boosted in the compensated image c(x,y), thus compensating for the illumination-induced variations contained in the electronic image v(x,y). The compensation system 50 in this embodiment produces an image that substantially appears as if there were no shadows in the scene caused by the illumination field. This is a very beneficial effect for wide dynamic range image sensing, computer vision, dynamic range compression, image displaying, printing and visualization, and other imaging applications.

In another embodiment, the compensation system 50 produces a compensated image c(x,y) according to:

$$c(x,y)=v(x,y)-u(x,y), \forall (x,y)\in\Omega. \tag{3}$$

In this embodiment, the compensated image c(x,y) contains substantially high-frequency components of the electronic image v(x,y) since the two frequency components of the smooth image u(x,y) have been removed. The advantageous effect of this embodiment is that the compensated image c(x,y) does not contain the large discontinuities.

The blending system 60 blends the original electronic image v(x,y), the compensated image c(x,y), and smooth image u(x,y) on a point-by-point basis according to:

$$b(x,y)=g(c(x,y),v(x,y),u(x,y)) \forall (x,y)\in\Omega \tag{4}$$

where b(x,y) is the blended image and g(c(x,y),v(x,y),u(x,y)) is a function that defines blending. In one embodiment, the blending system 60 may use a blending function g(c(x,y),v(x,y),u(x,y)) that scales the compensated image c(x,y) or scales the smoothed image u(x,y) according to:

$$b(x,y)=\alpha_1 c(x,y)+\beta_1, \forall (x,y)\in\Omega$$

$$b(x,y)=\alpha_2 u(x,y)+\beta_2, \forall (x,y)\in\Omega \tag{5}$$

where alpha and beta are constants. In another embodiment the blending system 60 may use another function g(c(x,y),v(x,y),u(x,y)) to perform blending that is controlled by the smooth image u(x,y). For example, the blended image can be produced according to:

$$b(x,y)=u(x,y)v(x,y)+(M-u(x,y))c(x,y), \forall (x,y)\in\Omega \tag{6}$$

where M is a non-negative constant such that M≧max(u(x, y)). Usually M=max(u(x,y)) can be taken. In this embodiment, the blended image mostly contains the original electronic image where the smooth image u(x,y) is large, which means where the electronic image v(x,y) is bright containing visible details. On the other hand, the blended image b(x,y) will mostly contain the compensated image c(x,y) where the smooth image u(x,y) is small. In this embodiment, the shadow areas the of image detail occupy very low signal levels in the original electronic image v(x,y) and are difficult to render on low dynamic range displays and prints. The overall blended image in this embodiment has reduced signal dynamics and good visibility of all details irrespective of illumination conditions. In one embodiment, the blending function uses the u(x,y) value to control the amount of mixing of v(x,y) and c(x,y).

In another embodiment, the blending system 60 produces the blended image by performing blending according to:

$$s(x,y)=f_a^u(v(x,y))+f_b^u(c(x,y)), \forall (x,y)\in\Omega \quad (7)$$

or:

$$s(x,y)=f_a^u(u(x,y))+f_b^u(c(x,y)), \forall (x,y)\in\Omega \quad (8)$$

where $f_a()$ and $f_b()$ are pixel-wise functions applying linear or nonlinear gain, and where superscript u indicates that the functions $f_a()$ and $f_b()$ may incorporate knowledge of u(x,y) to intelligently decide on the transformation that should be applied to each pixel in a similar way as it was illustrated in Equation (6).

The blending system 60 may, in addition, perform linear or nonlinear point-to-point mapping of the blended result just before producing the blended image b(x,y). This mapping may involve linear signal scaling, exponential mapping, logarithmic mapping, gamma curve mapping or various S-curve mappings. This mapping could be performed via use of a LUT.

The above-described embodiments of the blending system 60 produce the blended image b(x,y) with many advantageous and desirous properties including, but not limited to, reduced image noise, reduced dynamic range, reduced image variations due to illumination conditions, image detail enhancement, selective image enhancements in shadow regions only, and/or selective image enhancement in bright regions.

Now details of the operation of the discontinuity-preserving smoothing system 10 are described. The discontinuity-preserving smoothing system 10 accomplishes the step of discontinuity-preserving (a.k.a. edge-preserving) smoothing by finding an image u(x,y) that minimizes the following energy functional as shown in 9:

$$J(u(x,y))=\rho_1(x,y)C(u(x,y))+\rho_2(x,y)S(u(x,y)) \quad (9)$$

where C(u) is a closeness constraint, S(u) is a smoothness constraint and $\rho_1$ and $\rho_2$ are predetermined functions that balance the influence of closeness and smoothness constraints at various points (x,y) across the image. The closeness constraint requires the solution image u(x,y) or a function of it (e.g., Au, where A is a linear operator) to be close to a predetermined target image v(x,y). The smoothness constraint requires the solution image u(x,y) to be smooth in that its spatial derivatives are small. For this purpose, the first, second, or higher order spatial derivatives of u(x,y), alone or in any appropriate combination, can be included and penalized in the smoothness constraint S(u). The functions $\rho_1$ and $\rho_2$ provide means of balancing the contribution of the closeness and smoothness constraints to the energy functional at predetermined points in the image. In one embodiment, the means of balancing is controlled by at least a portion of the predetermined target image v(x,y). In one embodiment, balancing includes proportioning the closeness and smoothness constraints by an unequal amount.

In one embodiment, the discontinuity-preserving smoothing system 10 accomplishes the step of discontinuity-preserving smoothing by finding u(x,y) that minimizes the function with the following choice of smoothness constraint, closeness constraints and balancing function ρ as shown in 10:

$$J(u) = \int\int_\Omega \rho(x,y)(u-v)^2 dxdy + \lambda \int\int_\Omega (u_x^2 + u_y^2) dxdy \quad (10)$$

where the subscripts on u denote (first) partial derivatives in x and y directions, λ is a non-negative constant, and Ω refers to the image region. For clarity, spatial coordinates (x,y) are omitted from v, u and partial derivatives of u. The first term requires that u(x,y) should be close to v(x,y) while the second term requires that u(x,y) should be smooth. When minimized together, the result u(x,y) is a smooth version of the electronic image v(x,y). The parameter λ determines the smoothness of u(x,y). In one embodiment, the spatially varying non-negative permeability factor ρ(x,y) serves as the balancing means between the smoothness and closeness constraints. The spatially varying permeability function ρ(x,y) accounts for discontinuities in the input image and is responsible for the advantageous discontinuity-preserving feature exhibited by the discontinuity-preserving smoothing system 10 of the present invention. In one embodiment, ρ(x,y) can take the place of $\rho_1$, while $\rho_2=1$. This is not to be construed as limiting the scope of the present invention, since $\rho_2$ could have taken the principal role of balancing, while $\rho_1$ could have been made $\rho_1=1$. In another embodiment, both $\rho_1$ and $\rho_2$ could be non-constant and harmonized to jointly balance the closeness and smoothness contributions of Equations 9 and 10.

According to the present invention, the discontinuity-preserving smoothing system 10 derives the permeability function ρ(x,y) from the electronic image v(x,y), that is:

$$\rho(x,y)=f(v(x,y)) \quad (11)$$

Determined by the function $f(v(x,y))$, permeability ρ(x,y) has a property to monotonically increase with the increasing strength of discontinuities in the input image. For example, ρ(x,y) is large at large discontinuities in the electronic image v(x,y) and small at small discontinuities in the electronic image v(x,y). In that case the permeability function ρ(x,y) can cause the first term in the minimization functional to overpower the smoothness constrains at large discontinuities in the electronic image v(x,y) requiring that u(x,y) follows v(x,y). Consequently, the smooth image u(x,y) will preserve large discontinuities present in the electronic image v(x,y). At small discontinuities, the permeability function ρ(x,y) can be small, thus allowing the smoothness term in the minimization functional to introduce some degree of smoothing.

Several embodiments for the permeability function ρ(x,y) that exhibit the above-defined property are now described. It is contemplated herein that other forms of ρ(x,y) that exhibit the above-defined property are still within the scope of the present invention.

According to the present invention, the strength of discontinuities can be encoded with two families of discontinuity measures: 1) absolute discontinuity measures, and 2) relative discontinuity measures. The absolute discontinuity measures in the electronic image v(x,y) may be encoded by the p-norm of image gradient $\|\nabla(x,y)\|_p$ defined according to:

$$\|\nabla v(x, y)\|_p = \left(\left|\frac{\partial v}{\partial x}\right|^p + \left|\frac{\partial v}{\partial y}\right|^p\right)^{\frac{1}{p}}.$$

$L_1$ norm, $L_2$ norm and $L_\infty$ norm are most commonly used in practice. Respectively, they are shown in:

$$\|\nabla v(x, y)\|_1 = \left|\frac{\partial v}{\partial x}\right| + \left|\frac{\partial v}{\partial y}\right| \quad (12)$$

$$\|\nabla v(x, y)\|_2 = \sqrt{\left|\frac{\partial v}{\partial x}\right|^2 + \left|\frac{\partial v}{\partial y}\right|^2}$$

$$\|\nabla v(x, y)\|_\infty = \max\left(\left|\frac{\partial v}{\partial x}\right|, \left|\frac{\partial v}{\partial y}\right|\right)$$

where spatial coordinates (x,y) are omitted for clarity. Alternatively, the absolute discontinuity may be encoded by the absolute magnitude of the directional derivative of the electronic image v(x,y). Mathematically, the directional derivative ∂v/∂b in the direction of the unit vector $\rho \vec{b}$ is the dot product according to:

$$\frac{\partial v}{\partial b} = \stackrel{\rho}{b} \cdot \nabla v(x, y). \quad (13)$$

This is the normal projection of the image gradient onto the line defined by $\rho \vec{b}$. For example, the absolute value of the directional derivative in the direction of the x-axis is simply the absolute value of the partial derivative $|\partial v / \partial x|$.

According to the present invention, the relative discontinuity measures are those that provide a measure of discontinuity relative to a local signal magnitude. One family of relative discontinuity measures includes extensions of well-known Weber-Fechner contrast commonly defined as Δv/v, that is, Weber-Fechner contrast measures the relative signal change in respect to the local signal strength. In the present invention, the family of relative discontinuity measures are mostly presented as extensions of Weber-Fechner contrast defined as $\|\nabla v(x,y)\|_p / v(x,y)$. This is not to be construed as limiting the scope of the present invention, since other relative discontinuity measures would still fall within the scope of this invention. For example, adding a small positive constant ε to the denominator of the Weber-Fechner's contrast would be a way to handle possible division by zero while still providing a relative discontinuity measure. For commonly used vector norms discussed above, the examples of relative (e.g., Weber-Fechner-like) discontinuity measures are shown in:

$$\frac{\|\nabla v(x, y)\|_1}{v(x, y)} = \frac{\left|\frac{\partial}{\partial x}v\right| + \left|\frac{\partial}{\partial y}v\right|}{v(x, y)} \quad (14)$$

-continued $$\frac{\|\nabla v(x, y)\|_2}{v(x, y)} = \frac{\sqrt{\left|\frac{\partial}{\partial x}v\right|^2 + \left|\frac{\partial}{\partial y}v\right|^2}}{v(x, y)}$$

$$\frac{\|\nabla v(x, y)\|_\infty}{v(x, y)} = \frac{\max\left(\left|\frac{\partial v}{\partial x}\right|, \left|\frac{\partial v}{\partial y}\right|\right)}{v(x, y)}.$$

Alternatively, relative discontinuity measure may be encoded by using the absolute magnitude of the directional derivative relative to the local signal strength according to:

$$\frac{\left|\frac{\partial v(x, y)}{\partial b}\right|}{v(x, y)} = \frac{|\vec{b} \cdot \nabla v(x, y)|}{v(x, y)}. \quad (15)$$

According to the present invention the permeability function ρ(x,y) can be any monotonically increasing function of an absolute or relative image discontinuity measure. Example functions include, but are not limited to, ascending linear function, exponential function, power function or any other nondecreasing function or piece-wise smooth nondecreasing (a.k.a. strictly increasing) function.

In addition to the image discontinuity measure, the permeability function ρ(x,y) can include additional information about the electronic image v(x,y) such as the statistics of image and image noise as shown in:

$$\rho(x, y) = \frac{a}{\sigma_v^2(x, y)} \|\nabla v(x, y)\|_p, \; p = 1, 2, K, \infty \quad (16)$$

$$\rho(x, y) = \frac{a}{\sigma_v^2(x, y)} \frac{\|\nabla v(x, y)\|_p}{v(x, y)}, \; p = 1, 2, K, \infty$$

Using one absolute and relative discontinuity measure illustration, these examples also illustrate how knowledge about the statistics of the noise in the electronic image v(x,y) may be incorporated for optimal computation. In this example, $\sigma_v^2(x,y)$ is the variance of the noise in the electronic image v(x,y). This form would be appropriate for independently distributed measurement noise in electronic image v(x,y) with zero mean and variance $\sigma_v^2(x,y)$. If the noise variance is constant across the entire image, it could be included in the proportionality constant a. It is anticipated herein that other means for incorporating image signal statistics including signal's signal-to-noise ratio (SNR) are within the scope of the present invention.

The discontinuity-preserving smoothing system 10 can determine appropriate u(x,y) by minimizing the function of Equation 9 or Equation 10 via well-known gradient descent methods. A smooth image u(x,y) that minimizes the function of Equation 10 also satisfies the Euler-Lagrange equation with free boundary condition as shown:

$$u(x, y) + \frac{\lambda}{\rho(x, u)} \nabla^2 u(x, y) = v(x, y). \quad (17)$$

where $\nabla^2$ denotes the Laplace operator. Therefore, the discontinuity-preserving smoothing system 10 may perform a step of solving this linear elliptic partial differential equation (PDE) in order to produce the desired smooth image u(x,y) that substantially preserves sharp discontinuities in the electronic image v(x,y). One major advantage of the present invention is that the permeability function ρ(x,y) is a function of the electronic image v(x,y) that is independent of u(x,y), therefore, the resultant PDE is linear and the discontinuity-preserving system 10 can solve it very efficiently. For example, the partial differential equation shown in Equation 17 can be discretized on a rectangular lattice and efficiently solved by using any well-known multigrid methods for PDEs such as those disclosed in Trottenberg, U., et al., *Multigrid*, Academic Press, San Diego, Calif. 2001, which is herein incorporated by reference. Multigrid methods can solve Equation 17 with O(N) complexity, where N is the total number or lattice nodes or image pixels.

If the permeability function ρ(x,y) is separable, that is, it can be written as a product of two functions $\rho(x,y)=\rho_1(x,y)\rho_2(x,y)$, then the PDE of Equation 17 can be, for example, rewritten as Equation 18:

$$\rho_1(x, u)u(x, y) + \frac{\lambda}{\rho_2(x, u)}\nabla^2 u(x, y) = \rho_1(x, u)v(x, y) \quad (18)$$

These and similar mathematical variations of Equation 17 or Equation 10 are equivalent; therefore, the step performed by the discontinuity-preserving smoothing system 10 will continue to be generally described by Equation 17 without limiting the scope of the present invention.

Figure 6:
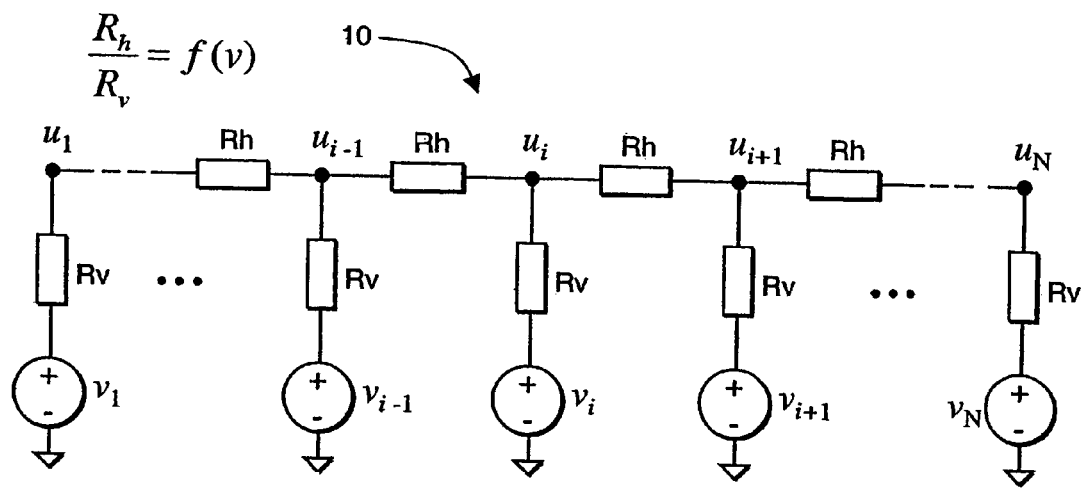
FIG. 6 is a schematic illustration showing a one-dimensional embodiment of the discontinuity-preserving smoothing means in accordance with the present invention.

FIGS. 6, 7, 8, 9, and 10 show several analog circuit embodiments of the discontinuity-preserving smoothing system 10 that naturally solve the PDE of Equation 17. FIG. 6 shows a one-dimensional resistive grid embodiment of the discontinuity-preserving smoothing means 10. Referring to FIG. 6, there is a plurality of nodes u corresponding one-to-one to plurality of pixels of a one-dimensional image $v_i$, where the subscript i denotes pixel index on uniform one-dimensional sampling lattice. A plurality of horizontal resistors Rh is distributed among said nodes, each resistor connecting adjoining nodes. The one-dimensional electronic image $v_i$ is supplied to the grid in a form of plurality of independent voltage sources whose negative terminals are connected to a common node and whose voltage magnitudes corresponds to the corresponding pixel or photodetector intensity. There is a plurality of vertical resistors Rv each vertical resistor connected between said nodes and the positive node of the corresponding said independent voltage sources.

The horizontal resistors in this embodiment function as smoothing means restricting the voltage difference among adjacent nodes $u_i$ that each horizontal resistor interconnects. The amount of the voltage difference restriction depends on the resistance of each individual horizontal resistor. A greater resistance will allow greater difference among adjacent nodes. An infinite resistance (e.g., open connection) places no restriction on difference of nodal voltages since the nodes are independent in that case. On the other hand, smaller resistance will demand smaller difference among adjacent nodes. A zero resistance (e.g., short connection) requires both nodal voltages to be equal since they are shorted. The vertical resistors function as a closeness means that restrict the difference from the nodal voltage $u_i$ and its corresponding input $v_i$. Similarly, as with horizontal resistors, smaller vertical resistors will require a smaller difference between $u_i$ and $v_i$. Larger vertical resistors will require less difference between $u_i$ and $v_i$.

The resistive grid of FIG. 6 solves the discretized PDE shown in Equation 17 for a one-dimensional case with natural (e.g., free) boundary conditions. For a one-dimensional case the PDE of Equation 17 discretizes to the following values:

$$u_i + \frac{\lambda}{h\rho_{i-\frac{1}{2}}}(u_i - u_{i-1}) + \frac{\lambda}{h\rho_{i+\frac{1}{2}}}(u_i - u_{i+1}) = v_i, \text{ for interior nodes}$$

$$u_i + \frac{\lambda}{h\rho_{\frac{1}{2}}}(u_i - u_2) = v_1, \text{ for left boundary}$$

$$u_N + \frac{\lambda}{h\rho_{N-\frac{1}{2}}}(u_N - u_{N-1}) = v_N, \text{ for right boundary}$$

where h is the lattice size, N is the total number of nodes (i.e., pixels) and fractional indices on permeability function ρ(x,y) which indicate that in this case the permeability function ρ(x,y) is estimated and sampled in between lattice nodes. To see how the resistive grid of FIG. 6 solves this set of linear equations, divide each equation with a nonzero, non-negative resistance value Rv to arrive to an equivalent set of equations, (Rv may be different for every equation):

$$\frac{u_i}{R_v} + \frac{\lambda}{R_v h\rho_{i-\frac{1}{2}}}(u_i - u_{i-1}) + \frac{\lambda}{R_v h\rho_{i+\frac{1}{2}}}(u_i - u_{i+1}) = \frac{v_i}{R_v}, \text{ for interior nodes}$$

$$\frac{u_1}{R_v} + \frac{\lambda}{R_v h\rho_{\frac{1}{2}}}(u_i - u_2) = \frac{v_1}{R_v}, \text{ for left boundary}$$

$$\frac{u_N}{R_v} + \frac{\lambda}{R_v h\rho_{N-\frac{1}{2}}}(u_N - u_{N-1}) = \frac{v_N}{R_v}, \text{ for right boundary.}$$

By realizing that this set of equations is also obtained by applying Kirchoff's current law to every node of the resistive grid of FIG. 6, it can be appreciated that the desired solution $u_i$ is obtained as steady state voltage $u_i$ on the nodes of the resistive grid of FIG. 6. It can also be appreciated that to solve the PDE of Equation 17 the discontinuity-preserving smoothing means 10 sets each horizontal resistor Rh between any two nodes A and B according to:

$$R_{h_{A,B}} = \frac{R_v h}{\lambda}\rho_{\frac{A+B}{2}}. \quad (19)$$

The value of a horizontal resistor Rh connecting two nodes A and B is set by sampling previously defined permeability function ρ(x,y) between the two nodes A and B. Therefore, the discontinuity-preserving smoothing system 10 controls the resistance of each horizontal resistor Rh as a function of the voltage sources $v_i$ via resistance control to strengthen or weaken the connection permeability among neighboring nodes in the grid. It can be intuitively appreciated that a larger resistance Rh among two neighboring nodes of the grid will allow voltages of those nodes to be further apart, thus allowing for discontinuities, whereas a smaller resistance Rh among two nodes will constrain the voltages of those nodes to be closer together, thus imposing certain amount of smoothing among those nodes. Local smoothness is controlled by the permeability function ρ(x,y). On the other hand global smoothness is controlled by parameter lambda. Increased lambda will make the entire voltage distribution $u_i$ of the solution smoother since all horizontal resistors would be somewhat decreased. One also can appreciate that the smoothness parameter lambda and the grid size h can be combined together into a single multiplicative parameter such that the resistance control means can be used to globally control smoothness. Furthermore, lambda and the grid size h can be lumped together with the vertical resistance Rv to produce a new scaled value for Rv. The discontinuity-preserving smoothing system 10 then controls Rv to set the global smoothness property of the solution $u_1$.

In general, it can be appreciated that the discontinuity-preserving smoothing property is controlled by relative strength of Rh and Rv, and not their absolute values:

$$\frac{R_h}{R_v} = \frac{h}{\lambda}\rho(v(x, y)) = f_{R_h/R_v}(v(x, y)) \tag{20}$$

which is obtained by rearranging Equation 19. Since the permeability function is a function of the electronic image v(x,y), the ratio of the resistors is also a function of the electronic image v(x,y). For practical chip implementation, the resistance Rv, and therefore Rh, may be made considerably large to limit the power dissipated by the entire network while still maintaining appropriate discontinuity-preservation. From Equation 20 it can be appreciated that the permeability function ρ(x,y) controls the ratio Rh/Rv. If all Rv are selected to be substantially identical (and perhaps globally controlled for the global smoothness property), each Rh is then controlled by the permeability function as described by Equation 19. On the other hand, if all Rh are selected to be substantially identical (and perhaps globally controlled for the global smoothness property), then Rv would be controlled by the permeability function according $$R_v = \frac{R_h \lambda}{h\rho(x, y)}. \tag{21}$$

Although in practice it may be convenient to maintain either horizontal or vertical resistors substantially equivalent, and subsequently only control the other, the permeability function may control both horizontal and vertical resistors simultaneously in order to adjust their ratio according to Equation 20. For convenience and brevity, the present disclosure will assume substantially identical vertical resistors substantially identical, while controlling only horizontal resistors with the permeability function. However, it is anticipated that the horizontal resistors may be kept substantially identical while the vertical resistors or the ratio Rh/Rv are controlled by the permeability function.

Figure 7:
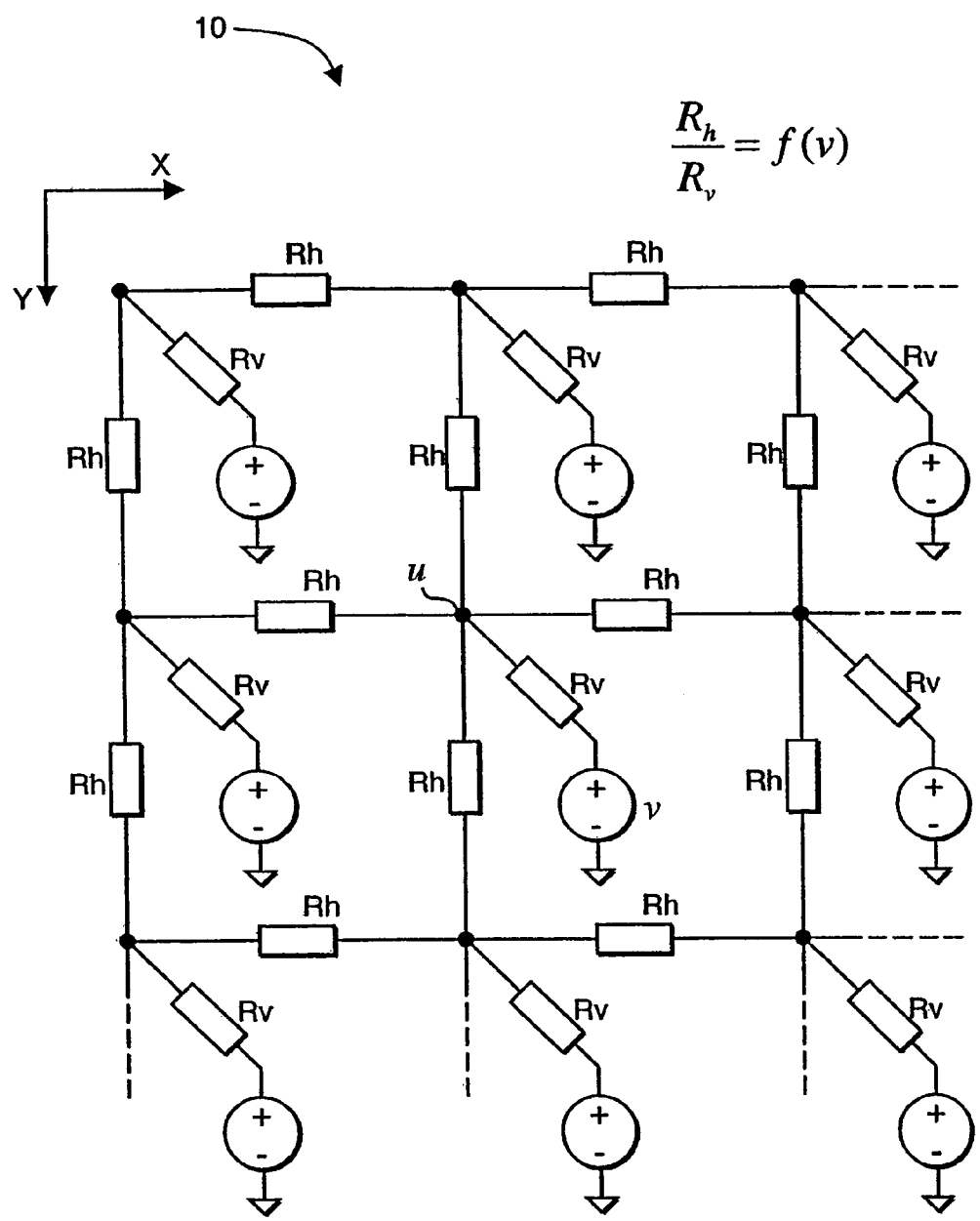
FIG. 7 is a schematic illustration showing a two-dimensional embodiment of the discontinuity-preserving smoothing means employing four nearest neighbor connectivity on a rectangular grid in accordance with the present invention.

FIG. 7 shows a two-dimensional resistive grid for solving two-dimensional version of the PDE of Equation 17. Referring to FIG. 7, there is a plurality of nodes corresponding one-to-one to plurality of pixels of a two-dimensional image $v_{i,j}$, where the subscript i,j denotes pixel index on a uniform two-dimensional rectangular sampling lattice. A plurality of horizontal resistors Rh is distributed among said nodes, each resistor connecting an adjoining node in a 4-nearest neighbor, (e.g., north-east-south-west) configuration. The two-dimensional electronic image $v_{i,j}$ is supplied to the grid in a plurality of independent equivalent voltage sources whose negative terminals are connected to a common node and whose voltage magnitudes corresponds to the corresponding pixel or photodetector intensities. A plurality of vertical resistors Rv are positioned within the grid, each connected between said nodes and the positive node of the corresponding said independent voltage sources.

Similarly as it was shown for the one-dimensional case in FIG. 6, the two-dimensional resistive grid of FIG. 7 solves the discretized PDE of Equation 17 for two dimensions. FIG. 7 shows the upper left corner of a two-dimensional grid to emphasize that the nodes u in the interior of the array are connected to four neighbors, the nodes on the edge, but not on the corners, are connected to three neighbors and nodes on the corners are connected to two neighbors. In one embodiment, the image boundary is rectangular. If the boundary is not rectangular inside (e.g., concave or convex) the corners may appear on the boundary in which case those nodes u are connected to four neighbors. For example, a typical discretized PDE equation for an interior node is shown:

$$\frac{u_{i,j}}{R_v} + \frac{\lambda}{R_v h_y \rho_{i,j-\frac{1}{2}}}(u_{i,j} - u_{i,j-1}) + \frac{\lambda}{R_v h_y \rho_{i,j+\frac{1}{2}}}(u_{i,j} - u_{i,j+1}) + \\ + \frac{\lambda}{R_v h_x \rho_{i-\frac{1}{2},j}}(u_{i,j} - u_{i-1,j}) + \frac{\lambda}{R_v h_x \rho_{i+\frac{1}{2},j}}(u_{i,j} - u_{i+1,j}) = \frac{v_{i,j}}{R_v} \tag{22}$$

for interior nodes.

Figure 8:
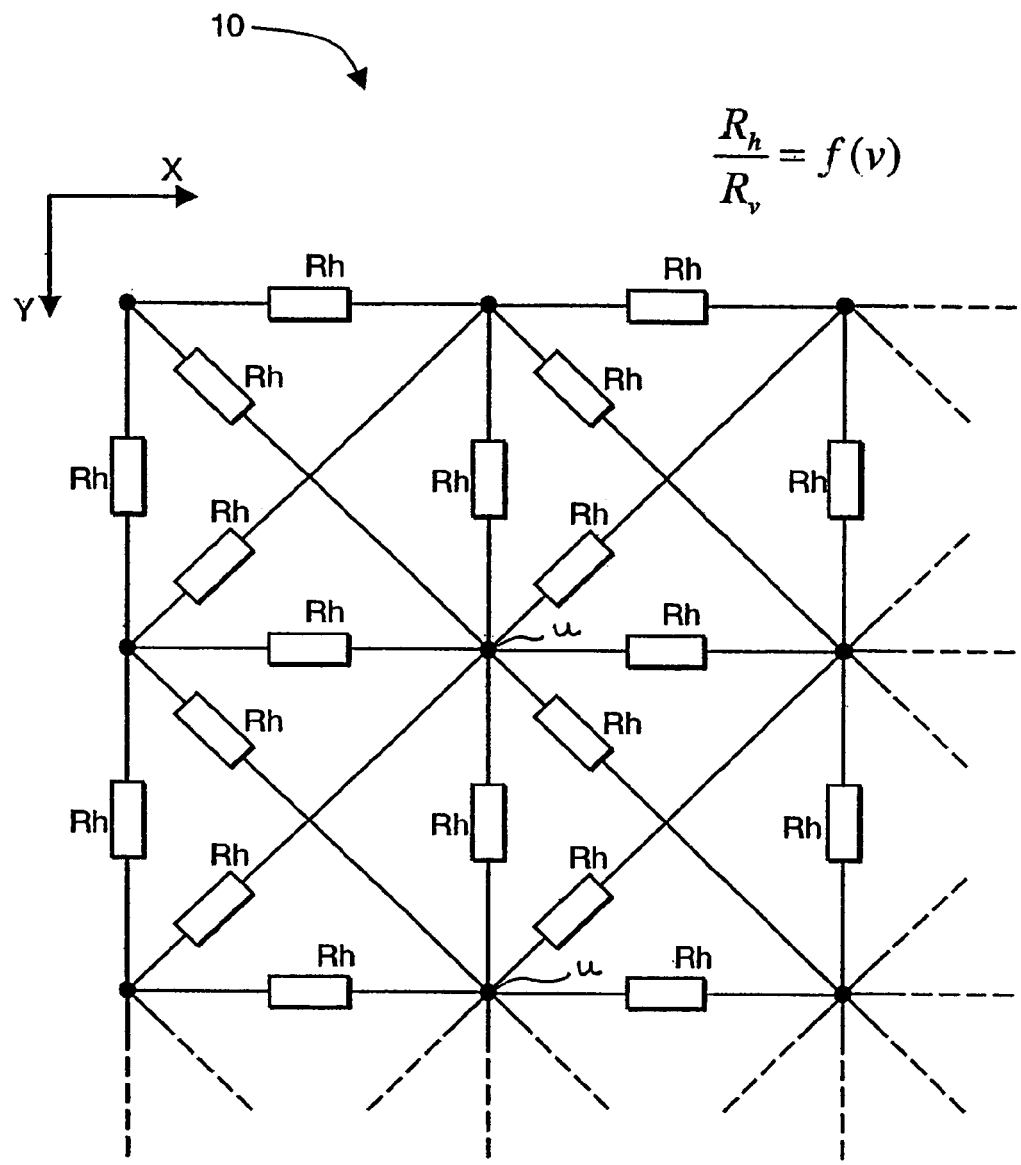
FIG. 8 is a schematic illustration showing a two-dimensional embodiment of the discontinuity-preserving smoothing means employing eight nearest neighbor connectivity on a rectangular grid in accordance with the present invention.

Again by inspecting Equation 21, it can be appreciated that the horizontal resistors between any two nodes are controlled according to the general expression of Equations 19 and 20, except that the possible grid size difference in x and y directions are also accounted for through $h_x$ and $h_y$. FIG. 8 shows another two-dimensional resistive grid for solving a two-dimensional version of the PDE of Equation 17. Referring to FIG. 8, there is a plurality of nodes corresponding one-to-one to a plurality of pixels of a two-dimensional image $v_{i,j}$, where the subscript i,j denotes pixel index on uniform two-dimensional rectangular sampling lattice of size $h_x, h_y$. A plurality of horizontal resistors Rh is distributed among said nodes u, each resistor connecting adjoining node u in a eight nearest neighbor configuration. The two-dimensional electronic image $v_{i,j}$ is supplied to the grid in a form of a plurality of independent voltage sources whose negative terminals are connected to a common node and whose voltage magnitudes corresponds to the corresponding pixel intensities. In one embodiment, a plurality of vertical resistors Rv are connected between the nodes u and the positive node of the corresponding independent voltage sources. For clarity, vertical resistors Rv and voltage source $v_{i,j}$ are not shown in FIG. 8.

Similarly as it was shown for the one-dimensional case, the two-dimensional resistive grid of FIG. 8 solves the discretized PDE of Equation 17. FIG. 8 shows the upper left corner of a two-dimensional grid to emphasize that the nodes in the interior of the array are connected to eight neighbors, nodes on the edge, but not on the corners, are connected to five neighbors, and nodes on the corners are connected to three neighbors. For example, a typical discretized PDE equation for interior nodes is shown:

$$\left.\begin{array}{l}\dfrac{u_{i,j}}{R_v} + \dfrac{\lambda}{R_v h_y \rho_{i,j-\frac{1}{2}}}(u_{i,j} - u_{i,j-1}) + \dfrac{\lambda}{R_v h_y \rho_{i,j+\frac{1}{2}}}(u_{i,j} - u_{i,j+1}) + \\[6pt] + \dfrac{\lambda}{R_v h_y \rho_{i-\frac{1}{2},j}}(u_{i,j} - u_{i-1,j}) + \dfrac{\lambda}{R_v h_y \rho_{i+\frac{1}{2},j}}(u_{i,j} - u_{i+1,j}) + \\[6pt] + \dfrac{\lambda}{R_v h_d \rho_{i-\frac{1}{2},j-\frac{1}{2}}}(u_{i,j} - u_{i-1,j-1}) + \dfrac{\lambda}{R_v h_d \rho_{i-\frac{1}{2},j+\frac{1}{2}}}(u_{i,j} - u_{i-1,j+1}) + \\[6pt] + \dfrac{\lambda}{R_v h_d \rho_{i+\frac{1}{2},j+\frac{1}{2}}}(u_{i,j} - u_{i+1,j+1}) + \dfrac{\lambda}{R_v h_d \rho_{i+\frac{1}{2},j-\frac{1}{2}}}(u_{i,j} - u_{i+1,j-1}) = \dfrac{v_{i,j}}{R_v}\end{array}\right\} \text{interior nodes} \quad (23)$$

$h_d = \sqrt{h_x^2 + h_y^2}$ is the diagonal distance from the center pixel to the corner pixel on eight neighbor discretization kernel. It is contemplated herein that Equation 23 can be easily modified to account for the lesser number of neighbors for the boundary nodes. From Equation 23, it can be appreciated that the horizontal resistors between any two nodes are controlled according to the general expression of Equations 19 and 20, except that the possible grid size difference in x and y directions are also accounted for through $h_x$, $h_y$ and $h_d$.

Figure 9:
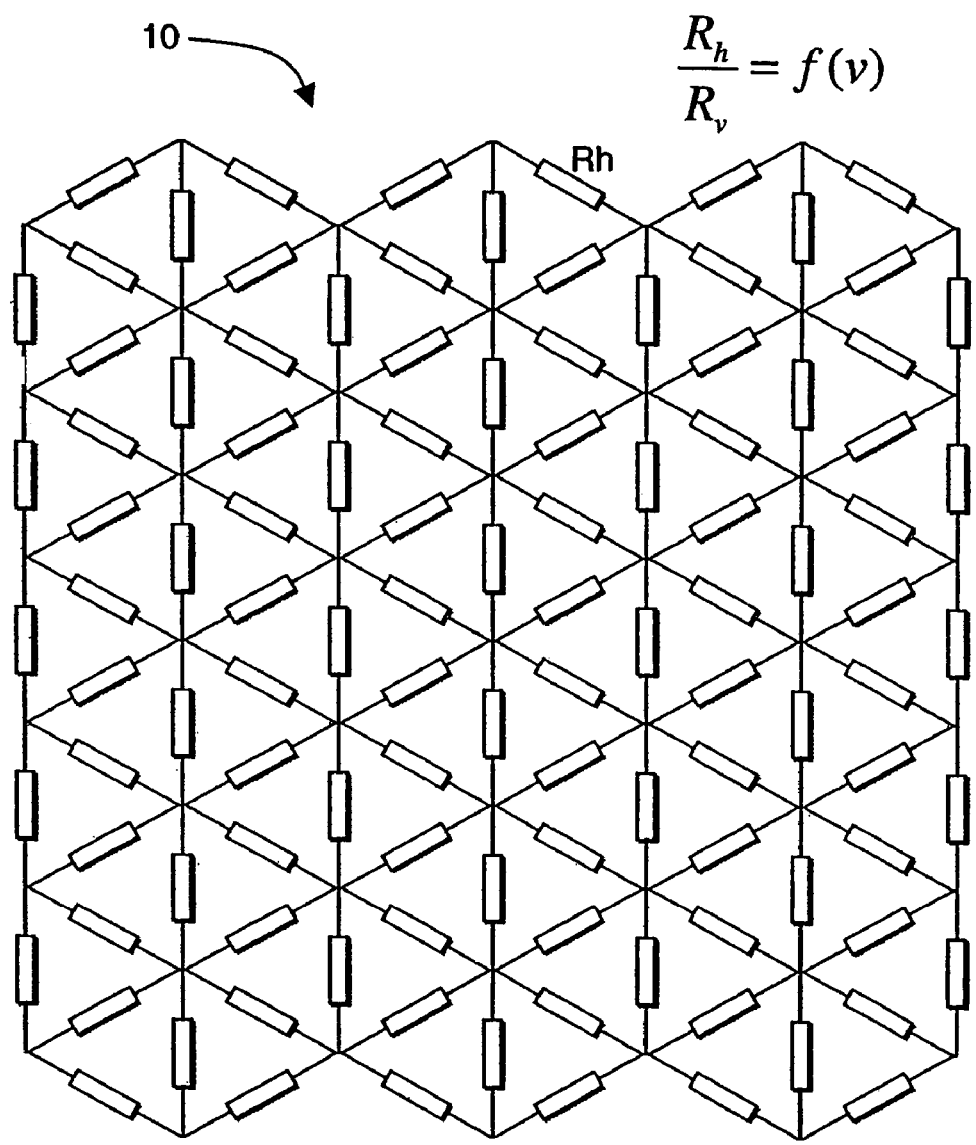
FIG. 9 is a schematic illustration showing a two-dimensional embodiment of the discontinuity-preserving smoothing means employing nearest neighbor connectivity on a hexagonal grid in accordance with the present invention.
Figure 10:
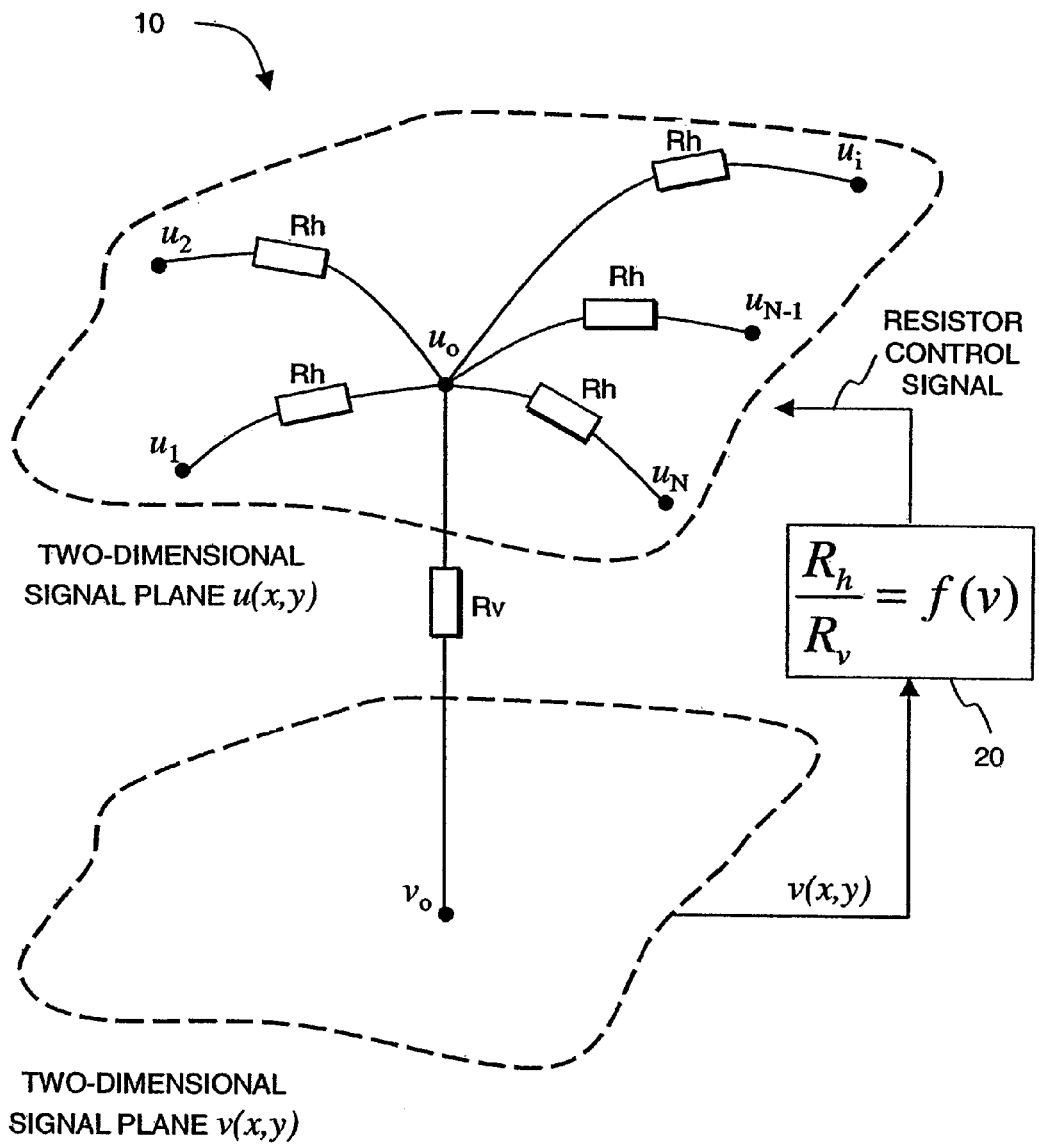
FIG. 10 is a schematic illustration showing a two-dimensional embodiment of the discontinuity-preserving smoothing means employing neighbor connectivity on continuous plan or arbitrary discrimination grid in accordance with the present invention.

Those skilled in the art can appreciate that the difference between the embodiments shown in FIGS. 7 and 8 is that the discretization of the Laplace operator in Equation 17 is done using the first difference approximations on a four neighbor and eight neighbor kernel respectively. FIG. 9 shows an example of the resistive grid that solves the PDE of Equation 17 on a uniform hexagonal sampling grid. For clarity, vertical resistors Rv and voltage source $v_{i,j}$ are not shown in FIG. 9. Equations for each node of the grid can be determined while accounting for boundary nodes. The horizontal resistors are still controlled according to the general expression of Equations 19 and 20. In general, as shown in FIG. 10, the discretization of PDE of Equation 17 or other objective function resulting from Equation 9 can be done on a resistive grid using any discretization kernel, using any one- or two-dimensional sampling grid, and using first, second and higher order difference approximation for the gradient, Laplace or other differential operator resulting from a particular choice of the smoothness constraint in Equation 9. Referring to FIG. 10, there is a plurality of nodes $u_q$ corresponding one-to-one to a plurality of pixels on a two-dimensional image $v_q$, where the subscript q denotes the pixel index on a uniform or non-uniform, regular or irregular two-dimensional sampling lattice. A plurality of horizontal resistors Rh serve as the smoothing means and are distributed among the nodes, where each resistor connects each of the nodes to a plurality of other nodes to perform the smoothing function required by Equation 9. In the embodiment illustrated in FIG. 10, the two-dimensional electronic image $v_q$ is supplied to the grid as a plurality of independent voltage sources (not shown explicitly) whose voltage magnitudes corresponds to the corresponding pixel intensities. A plurality of vertical resistors Rv control the degree of closeness and each vertical resistor is connected between the nodes $u_q$ and the electronic image pixel voltage source $v_q$ to impose the closeness constraint required by Equation 9. For clarity, FIG. 10 only shows instances of horizontal and vertical resistors that constrain the node $u_o$; however, it is to be understood that a similar collection of resistors exists at every node of the network.

Figure 11:
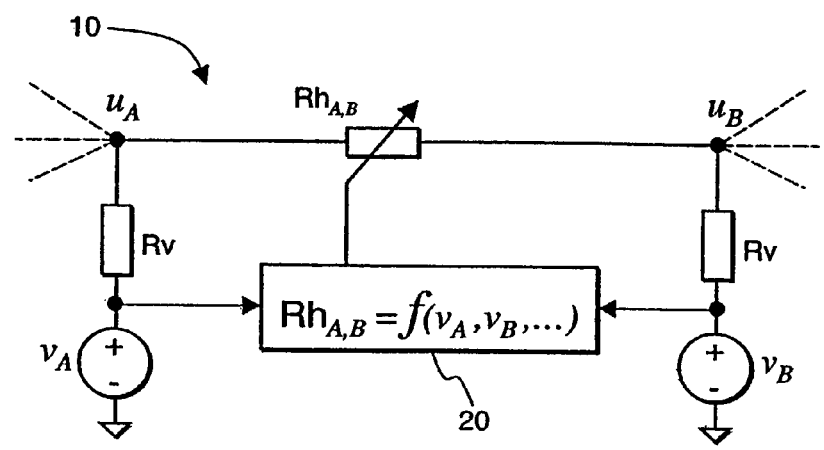
FIG. 11 is a schematic illustration showing voltage controlled resistance control means in conjunction with the discontinuity-preserving smoothing means in accordance with an embodiment of the present invention.
Figure 12:
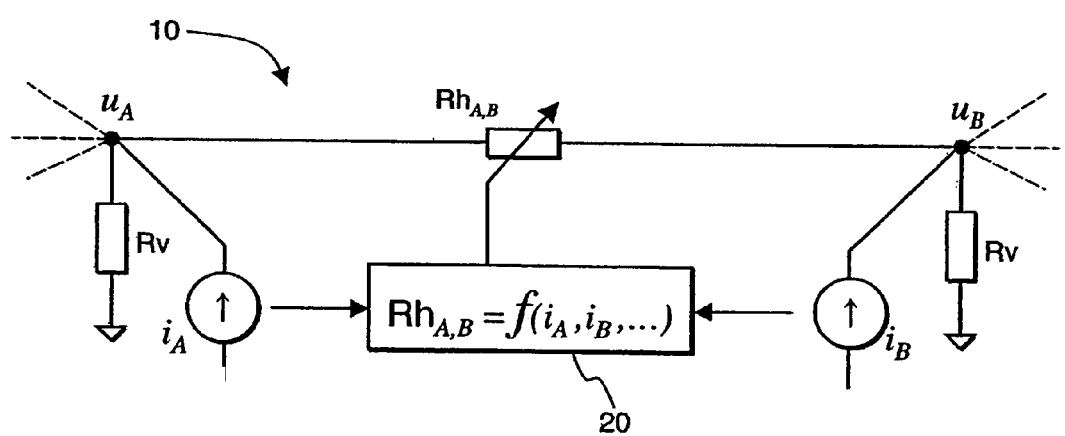
FIG. 12 is a schematic illustration showing a current controlled resistance control means in conjunction with the discontinuity-preserving smoothing means in accordance with an embodiment of the present invention.

FIG. 10 also shows a resistance control 20 for controlling the ratio Rh/Rv. The resistance control 20 serves as the balancing means that balances the degree of smoothing and the amount of closeness at each node of the network according to Equation 9. The resistance control 20 uses the electronic image v to estimate where to favor closeness constraint by increasing Rh/Rv and where to favor smoothness by decreasing Rh/Rv. FIGS. 11 and 12 show details of one embodiment of the discontinuity discontinuity-preserving smoothing system 10 showing resistance control 20 for controlling the horizontal resistor Rh. FIG. 11 shows Thevenin equivalent circuit in which the electronic image values are represented as voltages v(x,y). FIG. 12 shows a Norton equivalent circuit in which the electronic image values are represented as currents i(x,y). In this embodiment, the vertical electric branch that supplies image signals to the network and simultaneously imposes the closeness constraint can be either an electrical series of the vertical resistor Rv and a signal voltage source, or an electrical parallel of the vertical resistor Rv and a signal current source.

Still referring to FIGS. 11 and 12, the resistance control means 20 receives a local signal from the electronic image. Voltages v(x,y) from the embodiment of FIG. 11, or currents i(x,y) from the embodiment of FIG. 12 may be received. Additionally the resistance control 20 may receive a global smoothness parameter lambda (not shown) for the image intensity processing means 30. The global smoothness parameter lambda may be encoded either as voltage or current. Based on the local image signal and the global smoothness parameter lambda the resistance control means 20 derives a local resistance control signal. The resistance control signal is then used to set the local characteristic horizontal resistance and in that way control the ratio Rh/Rv.

In the embodiments depicted in FIGS. 11 and 12, the resistance control 20 receives two pixel values from the electronic image. The resistance control signal generated by the resistance control 20 performs the step of setting the resistance of the horizontal resistor Rh that connects the two nodes that correspond to the two pixel values. The resistance control 20 sets the resistance of the corresponding horizontal resistor Rh according to Equation 19. The resistance control 20 may accomplish this step by using absolute or relative discontinuity measures for $$\rho_{\frac{A+B}{2}}$$

which involve directional derivatives as shown in Equations 13 and 15.

As an example, if the discrete version of the permeability function ρ(x,y) described by Equation 13 is replaced in Equation 19, the horizontal resistor is controlled by the estimate of the local directional derivative of the electronic image in the direction of the line connecting node A and node B, shown:

$$R_{hA,B} = \frac{R_v h}{\lambda} \frac{|V_A - V_B|}{h} = \frac{R_v}{\lambda} |V_A - V_B|. \quad (24)$$

As another example, if the discrete version of the permeability function described by Equation 15 is replaced in Equation 19, the horizontal resistor is controlled by the estimate of the local Weber-Fechner's contrast based on the local directional derivative of the electronic image v(x,y) in the direction of the line connecting nodes A and B, shown:

$$R_{hA,B} = \frac{R_v h}{\lambda} \frac{\frac{|V_A - V_B|}{h}}{\min(V_A, V_B)} = \frac{R_v}{\lambda} \frac{|V_A - V_B|}{\min(V_A, V_B)} \quad (25)$$

where the local image intensity (e.g., background) for the computation of the Weber-Fechner contrast is taken to be the lesser of the two pixel values. As a computational convenience, the resistance control 20 can replace the Weber-Fechner's contrast in the step of calculating local resistance with so called Michelson's contrast, shown:

$$R_{hA,B} = \frac{R_v}{\lambda} \frac{|V_A - V_B|}{V_A + V_B} \quad (26)$$

where the local image intensity for the computation of the Weber-Fechner contrast is taken to be the average of the two pixel values. As these examples of calculating the horizontal resistance show, the permeability function ρ(x,y) that is based on the electronic image signal controls the smoothing, or lack of it, across discontinuities, while the global paramets X or Rv or both control how smooth the output of the discontinuity-preserving smoothing system 10 will be. The horizontal resistor may use a standard p-channel and/or n-channel MOSFET alone or in any suitable combination. In another embodiment, the horizontal resistor may employ a linear voltage-controlled resistance element disclosed in U.S. Pat. No. 5,293, 058 which is herein incorporated by reference. The resistance control 20 may be implemented using standard electronic circuitry techniques comprising differential amplifiers, multipliers, translinear circuits, log/anti-log amplifiers, and comparators. These and other electronic circuitry techniques commonly known in the art may be used alone or in any preferred combination to produce appropriate resistance control signal. For example, an electronic circuit that computes a local Michelson contrast can be used as the resistance control signal.

Figure 13:
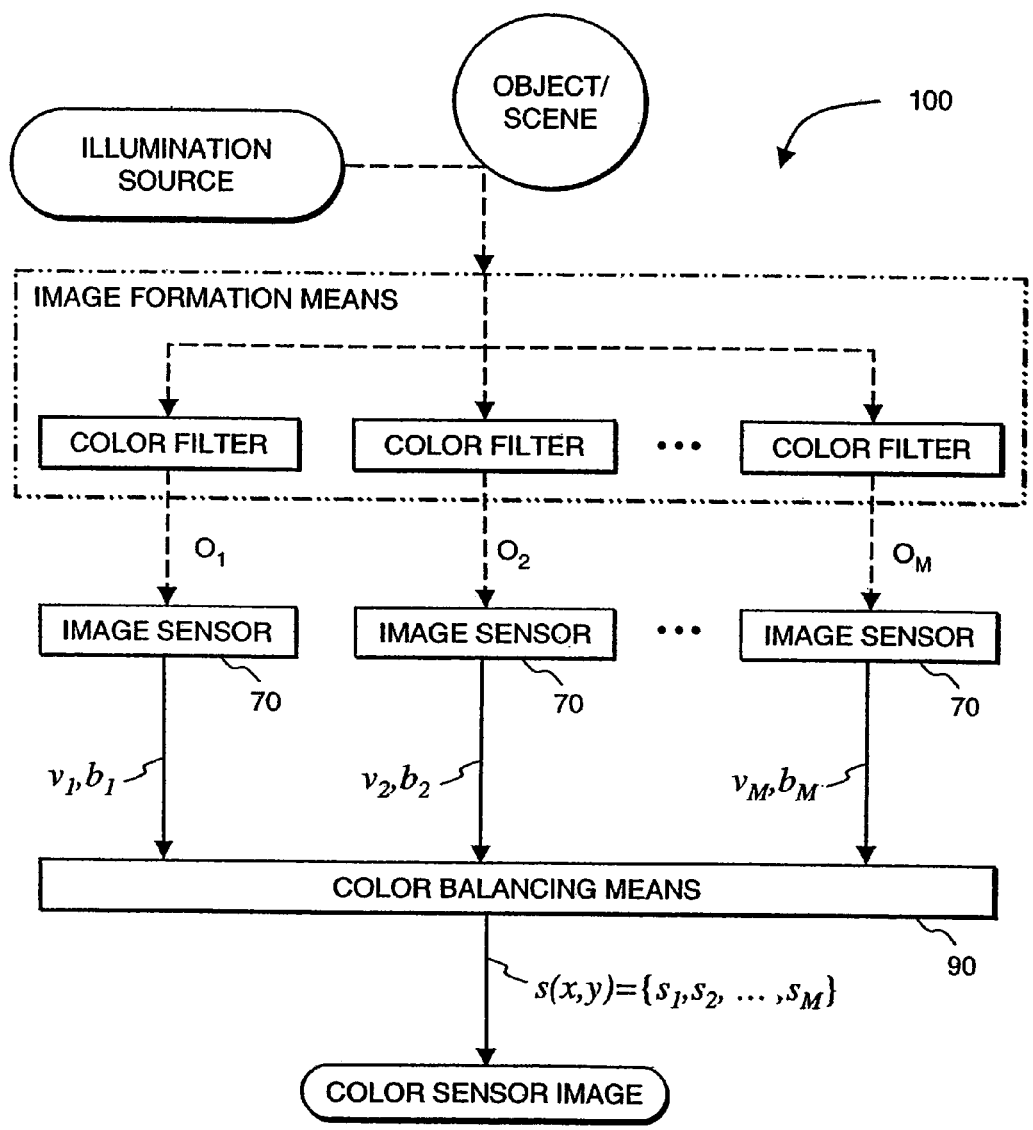
FIG. 13 is a block diagram showing a color sensor system for color imaging according to an embodiment of the present invention.

FIG. 13 shows a color sensor system 100 for color imaging using the image sensor 70. As shown in FIG. 13, the color sensor system 100 is substantially organized in W color channels. The image formation system produces several spectrally limited optical images o(x,y)={$o_1, o_2, \ldots, o_j, \ldots, o_W$} each corresponding to one color channel. The subscript j denotes the j-th color channel. The image sensor 70 in each color channel receives its corresponding spectrally limited optical image. The image scaling and color balancing means 100 receives at least the multispectral electronic image v(x,y)= {$v_1, v_2, \ldots, v_j, \ldots, v_w$} and the multispectral blended image b(x,y)={$b_1, b_2, \ldots, b_j, \ldots, b_W$} from the image sensors 70, and produces a color sensor image containing W channel signal within, that is s(x,y)={$s_1, s_2, \ldots, s_j, \ldots, s_W$}.

An appropriate image formation system containing prisms, beam splitters and spectrally selective optical filters and coatings can be arranged in such a way to simultaneously, or in a time sequence, produce a plurality of optically aligned spectrally limited images o(x,y)={$o_1, o_2, \ldots, o_j, \ldots, o_M$}. For example, to produce a standard red-green-blue (RGB) optical image, a dichroic beam splitter can be used to separate incoming white image images into three optically aligned images, one for red (R), one for green (G) and one for blue (B) color images. In this case, the image sensors 70 may be located on separate integrated circuits, each sensing their corresponding optical image. A well-known 3-CCD color camera is an example of this arrangement, except that according to the present invention the image sensors 70 take the place of the conventional CCD sensors.

Alternatively, RGB optical filter mosaics can be placed over a detector array disposed on a single sensitive surface to define three interleaved detector arrays 80 each sensitive to R, G or B color. A well-known Bayer color filter pattern R-G-B-G can be tessellated over the array of detectors to produce a color filter mosaic. In this case the image sensors 70 coexist on the same integrated circuit. A single white optical image is focused onto the sensitive surface of the color sensor system 100, the said surface contains the three photodetector arrays 80 interleaved according to the Bayer pattern. Therefore, it should be understood that the color sensor system 100 of the present invention pertains to both a single integrated circuit embodiment and a multiple integrated circuit embodiment.

Referring to FIG. 13, the operation of the color camera system 100 is as follows. The image sensors 70 sense their corresponding spectrally limited optical images with the detector arrays 80 to produce the multispectral electronic image v(x,y)={$v_1, V_2, \ldots, v_j, \ldots, v_W$}. The discontinuity-preserving smoothing system 10 within corresponding image sensor 70 uses its corresponding components of the multi-spectral electronic images $v_j(x,y)$ to produce the components of the multispectral smooth image u(x,y)={$u_1, u_2, \ldots, u_j, \ldots, u_W$} as described earlier. The compensation system 50 and the blending system 60 produce a compensated image $c_j(x,y)$ and the blended image $b_j(x,y)$ respectively as described earlier according to the present invention. The scaling and color balancing means 90 produce the multispectral color sensor image s(x,y) at the output of the color sensor system 100 by performing the following function:

$$s_j(x, y) = \left(\frac{v_j(x, y)}{L(v(x, y))}\right)^\alpha L(b(x, y)), \quad j = 1, 2, \Lambda, W \quad (27)$$

where v(x,y)={$v_1(x,y), v_2(x,y), \ldots, v_W(x,y)$}, b(x,y)={$b_1(x, y), b_2(x,y), \ldots, b_W(x,y)$} are electronic and blended images respectively, alpha is a constant that controls the color saturation in the resultant sensor color image, and L( ) is a luminance of a multispectral color image. As commonly known in the art, the luminance of a multispectral color image is usually calculated as an appropriate linear combination of individual color channels. Therefore, the color balancing system 90 produces the color sensor image s(x,y) by colorizing the luminance of the blended image b(x,y) according to the color sensed in the electronic image v(x,y).

In the case of a single integrated circuit embodiment, the color balancing system 90 also includes interpolation means (not shown) that precedes the coloring function. As commonly known, the interleaved color detector arrays provide pixel data on sparse interleaved sampling grids; therefore, the full resolution images for each color channel must be interpolated for missing pixel values in both the electronic image v(x,y) and the blended image b(x,y). Image sensor technology available from Foveon, Inc. is capable of deploying stacked RGB detectors. In this case, the interpolation is not necessary since the measurements are available at high resolution for all color channels. The above-described embodiments of the color sensor system 100 produce the color sensor image s(x,y) with many advantageous and desirous properties including, but not limited to, reduced image noise, reduced dynamic range, reduced image variations due to illumination conditions, image detail enhancement, selective image enhancements in shadow regions only, and/or selective image enhancement in bright regions.

Figure 14:
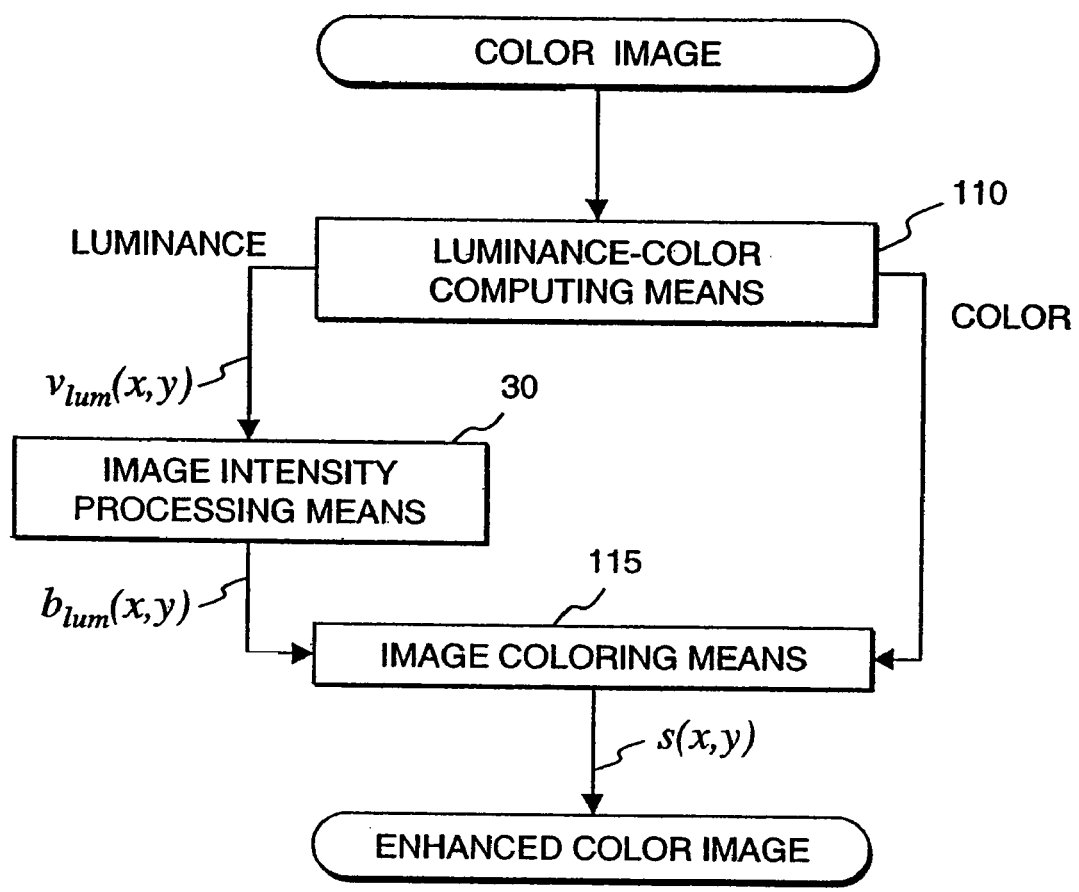
FIG. 14 is a block diagram showing a color image processing system in accordance with an embodiment of the present invention.

FIG. 14 shows another embodiment of color image processing system. A multispectral electronic image is supplied to the luminance-color computing system 110. The luminance-color computing means 110 produces luminance image $v_{lum}(x,y)$ and at least one image describing color information. The luminance image is supplied to the image intensity processing system 30 which produces the blended image $b_{lum}(x,y)$. An image coloring means 115 produces the enhanced color image by colorizing the blended image $b_{lum}(x,y)$ supplied by the image intensity processing system 30 using the color information supplied by the luminance-color computing system 110. The operation of the color image processing system shown in FIG. 14 is as follows. The luminance-color computing system 110, takes a multispectral color image and computes the luminance $v_{lum}(x,y)$ and at least one image describing color information. For example, if the multispectral color image was a standard RGB image, the luminance-color computing system 110 may convert it from RGB color space into well-known YUV space, where Y is luminance image, U is the first color image and V is the second color image. The image intensity processing system 30 operates on the luminance image, in this example the Y image, and produces the blended image $b_{lum}(x,y)$. Then, the image coloring 115 takes the blended image $b_{lum}(x,y)$, uses it as a luminance channel and performs the color conversion from YUV color space into RGB color space to produce the final enhanced color image. Alternatively, the luminance-color computing system 110 can perform the conversion from RGB into well-known HSV (or HSL) color space where H is hue, S is saturation and V is value (L is lightness). The image intensity processing system 30 processes the value channel V (or lightness channel L). Then, the image coloring 115 takes the blended image $b_{lum}(x,y)$, uses it as a value (or lightness) channel and performs the color conversion from HSV (or HSL) color space into RGB color space to produce the final enhanced color image. Alternatively, the luminance-color computing system 110 can compute luminance and color information from the multispectral color image $v(x,y)=\{v_1, v_2, \ldots, v_W\}$ as follows:

$$v_{lum}(x, y) = L(v(x, y)) \quad (28)$$
$$r_j(x, y) = \frac{v_j(x, y)}{v_{lum}(x, y)}, \quad j = 1, 2, \Lambda, W$$

where L( ) computes the luminance as a linear combination of components of the multispectral color image v(x,y). $r_j(x,y)$ represents $j^{th}$ color. Once the image intensity processing system 30 computes the blended image $b_{lum}(x,y)$, the image coloring means can produce the enhanced color image s(x,y)=$\{s_1, s_2, \ldots, s_W\}$ as follows:

$$S_j(x,y)=(r_j(x,y))^\alpha u_{lum}(x,y), j=1,2,\Lambda,W \quad (29)$$

where alpha is a constant that can be used to control the color saturation in the enhanced color image. It is contemplated herein that additional color spaces (e.g., L*a*b* color space) can be used to achieve similar functionality. The color image processing system produces color sensor images s(x,y) with many advantageous and desirous properties including, but not limited to, reduced image noise, reduced dynamic range, reduced image variations due to illumination conditions, image detail enhancement, selective image enhancements in shadow regions only, and/or selective image enhancement in bright regions. The present invention has been described with reference to several preferred embodiments. However, it will be appreciated that a person of ordinary skill in the art can effect variations and modifications without departing from the scope of the invention.

What is claimed is:

1. An electronic image sensor, comprising:
   a detector array for detecting an input image and for producing an electronic image signal including a plurality of signal samples; and
   an image intensity processing array having a plurality of nodes, each node connected to a corresponding detector in the detector array, comprising:
      a discontinuity-preserving smoothing system for producing a smooth image signal from the electronic image signal, wherein large discontinuities in the image signal are substantially preserved in the smooth image signal and small discontinuities in the electronic image signal are substantially smoothed over in the smooth image signal; the discontinuity-preserving smoothing system comprising:
      a plurality of horizontal resistive elements for imposing a smoothness constraint by restricting a signal difference across a pair of nodes;
      a plurality of vertical resistive elements for imposing a closeness constraint by restricting a difference between the electronic image signal and the signal on a corresponding node; and
      a balancing system for producing a smooth image signal by favoring the closeness constraint over the smoothness constraint according to a permeability function, the permeability function substantially being a function of the electronic image signal.

2. The image sensor of claim 1, wherein the input image is visible white light, visible colored light, X-ray radiation or infrared radiation.

3. The image sensor of claim 2, further comprising a luminance-color computing system for separating a colored light image into a color component and a luminance component, wherein the electronic image signal is representative of the luminance component.

4. The image sensor of claim 3, wherein the smooth image signal is colored according to the color component to produce an enhanced color image.

5. The image sensor of claim 1, wherein the image intensity processing array further comprises a sample preamplifier for amplifying the signal samples before the electronic image signal is communicated to the image intensity processing array.

6. The image sensor of claim 5, wherein the sample preamplifier utilizes one of: nonlinear or linear signal mapping.

7. The image sensor of claim 6, wherein the nonlinear signal mapping includes at least one of: gamma curve mapping, logarithmic curve mapping, and S-curve type mapping.

8. The image sensor of claim 1, wherein at least a part of the image intensity processing array and at least part of the detector array are located within the same integrated circuit.

9. The image sensor of claim 1, wherein the horizontal and vertical resistive elements are MOS devices.

10. A non-transitory computer readable medium having stored thereon instructions which, when executed by a processor, cause the processor to perform the steps of:
receiving first signal samples, representative of an image;
solving for voltages by solving a system of equations describing a discontinuity-preserving smoothing circuit for producing a second signal from the first signal, wherein large discontinuities in the first signal are substantially preserved in the second signal and small discontinuities in the first signal are substantially smoothed over in the second signal; the discontinuity-preserving smoothing circuit comprising:
a plurality of nodes, the first signal samples received as current being injected into the nodes;
a first plurality of resistors connected between each said node and a common voltage level thus imposing a closeness constraint by restricting a difference between the nodal voltages and the common voltage level;
a second plurality of resistors connected between pairs of the nodes, thus imposing a smoothness constraint by restricting a signal difference between the corresponding pairs of nodes;
wherein the values of each resistor in the second plurality of resistors is controlled by the strength of discontinuities in the first signal, the strength of discontinuities being determined as a Weber-Fechner contrast of the first signal, thus balancing between the smoothness and closeness constraints to produce voltages on said nodes, the nodal voltages representing the second signal.

11. An apparatus comprising an analog circuit comprising:
means for supplying a first signal;
means for performing a discontinuity-preserving smoothing over at least a portion of the first signal to produce a second signal, comprising:
a first plurality of resistive elements Rh imposing a smoothness constraint by selectively restricting a difference between samples of the produced second signal;
a second plurality of resistive elements Rv imposing a closeness constraint by selectively restricting a difference between samples of the second signal and samples of the first signal;
wherein the smoothness constraint is controlled by resistance values of individual resistive elements in the first plurality of resistive elements, or the closeness constraint is controlled by resistance values of individual resistive elements in the second plurality of resistive elements, or both the smoothness and closeness constraints are controlled by resistance values of individual resistive elements in the first and second pluralities of resistive elements, thus balancing between the closeness constraint and the smoothness constraint to produce the second signal whereby large discontinuities present in the first signal are substantially preserved in the second signal, and small discontinuities present in the first signal are substantially smoothed over in the second signal, and
wherein controlling individual resistances is done in response to a permeability function, the permeability function substantially being a function of the strength of discontinuities in the first signal.

12. The apparatus of claim 11, wherein the ratio Rh/Rv, the Rh/Rv being the ratio between resistive values of each resistive element Rh and corresponding resistive element Rv, is controlled by the permeability function.

13. The apparatus of claim 11, wherein at least one of the resistive elements Rh and Rv are circuit networks, each network having at least one MOS device.

14. The apparatus as defined in claim 11, wherein at least a portion of the means for imposing a discontinuity-preserving smoothing resides within a single integrated circuit.

15. A method of producing an improved electronic image comprising the steps of:
supplying a first image;
producing a second image by solving for nodal voltages of a circuit comprising:
a plurality of input nodes, samples of the first image being supplied to the input nodes as a voltage source connected between the input nodes and a common voltage level;
a plurality of output nodes, wherein samples of a second image are produced as voltages on the output nodes;
a first plurality of resistors Rv connecting each input node to a corresponding output node, thereby imposing a closeness constraint by restricting a voltage difference between said input nodes and said corresponding output nodes; and
a second plurality of resistors Rh connecting pairs of output nodes, thereby imposing a smoothness constraint by restricting a voltage difference between connected nodes in the said pairs of output nodes;
controlling the values of each Rh resistor with a relative measure of discontinuities in the first image, the controlling being determined as a local spatial change of the first image relative to a local signal strength of the first image, thereby balancing between the smoothness and closeness constraints across said pluralities of input and output nodes to produce voltages on said output nodes representing the second image, whereby the second image becomes a discontinuity-preserved version of the first image in which discontinuities with a large value of the relative measure of discontinuities in the first image are preserved in the second image and discontinuities with a small value of the relative measure of discontinuities in the first image are smoothed over in the second image; and
compensating the first image with the second image to produce a compensated image.

16. The method of claim 15, further including producing a blended image as a function of one or more signals selected from the group consisting of the first image, the second image, and the compensated image.

17. The method of claim 16, wherein the first image is a color image, further comprising separating the color image into a luminance component and a color component, the luminance component corresponding to the first image, and colorizing the blended image according to the color component.

18. The method of claim 15, wherein compensating includes dividing the magnitude of the first image by the magnitude of the second image.

19. The method of claim 15, wherein compensating includes subtracting the magnitude of the second image from the magnitude of the first image.

20. The method of claim 16, wherein supplying a first image, producing a second image, compensating the first image and blending are performed for each spectral component of the first image.

21. The method of claim 20, further including color balancing, wherein the color balancing is performed using spectral components of the blended image.

22. The method of claim 15, wherein supplying the first image further includes the steps of:
   forming at least one radiance image, each radiance image corresponding to at least one spectral band;
   projecting each said radiance image on a corresponding sensitive surface of a sensing means; and
   sensing each radiance image with the corresponding sensitive surface of the sensing means, and
   emitting the first image as a plurality of images, one image emitted for each spectral band.

23. The method of claim 15, further including reading instructions stored on a computer readable medium, and executing the instructions by a processor.

24. The method of claim 15, wherein the relative measure is a ratio of a vector norm of the gradient of the first image, and corresponding local signal strength of the first image.

25. The apparatus of claim 11, further comprising:
   means for compensating the first signal with the second signal to produce a third signal; and
   means for producing blended signal as a function of one or more of: the first signal, the second signal, and the third signal.

26. The apparatus as defined in claim 25, wherein the means for supplying the first signal resides within a single integrated circuit together with at least one of means selected from the group consisting of:
   the means for performing a discontinuity-preserving smoothing;
   the means for compensating the first signal with the second signal; and
   the means for producing a blended signal.

27. The apparatus as defined in claim 26, further including a plurality of said single integrated circuits in close electric communication and operating simultaneously.

28. The apparatus as defined in claim 11, wherein the controlling permeability function includes an absolute strength of discontinuities in the first signal, the absolute discontinuity strength being determined as a vector norm of the gradient of the first signal, or vector norm of a directional derivate of the first signal.

29. The apparatus as defined in claim 11, wherein the controlling permeability function includes a relative strength of discontinuities in the first signal, the relative discontinuity strength being determined by a ratio of a vector norm of the gradient of the first signal, and corresponding local signal strength of the first signal.

30. The apparatus as defined in claim 28, wherein the controlling permeability function of the first signal is a monotonic function of a relative strength of discontinuity.

31. The apparatus as defined in claim 29, wherein the controlling permeability function of the first signal is a monotonic function of an absolute strength of discontinuity.

32. The apparatus as defined in claim 14, further including a plurality of said single integrated circuits in close electric communication operating simultaneously.

33. The image sensor of claim 1, wherein the permeability function is controlled by a measure of the strength of discontinuities in the electronic image signal, the measure including an absolute strength of discontinuities in the input image, the absolute discontinuity strength being determined as a vector norm of the gradient of the input image, or vector norm of a directional derivate of the input image.

34. The image sensor of claim 1, wherein the permeability function is controlled by a measure of the strength of discontinuities in the electronic image signal, the measure including a relative strength of discontinuities in the input image, the relative discontinuity strength being determined by a ratio of a vector norm of the gradient of the input image, and corresponding signal strength of the input image.

35. The image sensor of claim 1, wherein the permeability function is a monotonic function of a relative strength of discontinuities in the electronic image signal.

36. The image sensor of claim 1, wherein the permeability function is a monotonic function of an absolute strength of discontinuity in the electronic image signal.

37. The image sensor of claim 1, further comprising a compensation system for compensating the electronic image signal with the smooth image signal to produce a compensated image signal.

38. The image sensor of claim 37, further comprising a blending system for producing a sensor image signal as a function of one or more of: the compensated image signal, the smooth image signal, and the electronic image signal.

* * * * *